United States Patent
Zhao et al.

(10) Patent No.: US 12,284,367 B2
(45) Date of Patent: *Apr. 22, 2025

(54) PICTURE RECONSTRUCTION METHOD AND APPARATUS

(71) Applicant: HUAWEI TECHNOLOGIES CO., LTD., Shenzhen (CN)

(72) Inventors: Yin Zhao, Hangzhou (CN); Haitao Yang, Shenzhen (CN); Riyang Zhao, Shenzhen (CN); Zhongliang Li, Beijing (CN); Lian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,963

(22) Filed: Feb. 2, 2024

(65) Prior Publication Data

US 2024/0205419 A1 Jun. 20, 2024

Related U.S. Application Data

(63) Continuation of application No. 17/345,295, filed on Jun. 11, 2021, now Pat. No. 11,924,438, which is a
(Continued)

(30) Foreign Application Priority Data

Dec. 15, 2018 (CN) .......................... 201811539678.1
Dec. 24, 2018 (CN) .......................... 201811585506.8

(51) Int. Cl.
*H04N 19/119* (2014.01)
*H04N 19/159* (2014.01)
(Continued)

(52) U.S. Cl.
CPC ......... *H04N 19/159* (2014.11); *H04N 19/119* (2014.11); *H04N 19/176* (2014.11); *H04N 19/186* (2014.11)

(58) Field of Classification Search
None
See application file for complete search history.

(56) References Cited

U.S. PATENT DOCUMENTS 10,009,607 B2 * 6/2018 Nakamura ........... H04N 19/159
2013/0107970 A1 5/2013 Wang et al.
(Continued)

FOREIGN PATENT DOCUMENTS

CN 103096066 A 5/2013
CN 104918055 A 9/2015
(Continued)

OTHER PUBLICATIONS

ITU-T Telecommunication Standardization Sector of ITU. "Line Transmission of Non-Telephone Signals, Video Codec for Audio-visual Services at p x 64 kbits." International Telecommunication Union. H.261 (Mar. 1993). 29 pages.
(Continued)

*Primary Examiner* — Mohammad J Rahman
(74) *Attorney, Agent, or Firm* — Maier & Maier, PLLC

(57) ABSTRACT

Embodiments of this application disclose a picture reconstruction method and apparatus for a video picture. The picture reconstruction method includes: obtaining a prediction mode of a current coding unit, and/or obtaining a prediction partition mode of the current coding unit, where the current coding unit includes a luma coding block and a chroma coding block, and the prediction partition mode is a mode of splitting the current coding unit into prediction blocks or prediction units; obtaining a transform block of the current coding unit based on the prediction partition mode
(Continued)

and/or the prediction mode; and generating a reconstructed picture block of the current coding unit based on the transform block. According to the method in the embodiments of this application, video coding efficiency can be improved.

7 Claims, 11 Drawing Sheets

Related U.S. Application Data continuation of application No. PCT/CN2019/125393, filed on Dec. 13, 2019.

(51) Int. Cl.
*H04N 19/176* (2014.01)
*H04N 19/186* (2014.01)

(56) References Cited

U.S. PATENT DOCUMENTS

| | | | |
|---|---|---|---|
| 2013/0136175 A1 | 5/2013 | Wang et al. | |
| 2013/0301705 A1* | 11/2013 | Seregin | H04N 19/18 375/240.02 |
| 2013/0329784 A1 | 12/2013 | Chuang et al. | |
| 2014/0072033 A1 | 3/2014 | Chuang et al. | |
| 2014/0133565 A1 | 5/2014 | Lee et al. | |
| 2014/0140404 A1* | 5/2014 | Liu | H04N 19/70 375/240.12 |
| 2014/0254674 A1* | 9/2014 | Lee | H04N 19/139 375/240.12 |
| 2015/0043641 A1 | 2/2015 | Gamei et al. | |
| 2015/0078447 A1 | 3/2015 | Gamei et al. | |
| 2015/0304662 A1 | 10/2015 | Liu et al. | |
| 2015/0373327 A1* | 12/2015 | Zhang | H04N 19/176 375/240.03 |
| 2016/0227222 A1* | 8/2016 | Hu | H04N 19/593 |
| 2016/0249060 A1* | 8/2016 | Nakamura | H04N 1/00042 |
| 2016/0323574 A1* | 11/2016 | Nakamura | H04N 1/00042 |
| 2016/0323588 A1* | 11/2016 | Nakamura | H04N 19/11 |
| 2017/0302981 A1 | 10/2017 | Sethuraman et al. | |
| 2018/0070082 A1 | 3/2018 | Lim et al. | |
| 2019/0364298 A1 | 11/2019 | Kang et al. | |
| 2020/0021804 A1 | 1/2020 | Jun et al. | |
| 2020/0267408 A1 | 8/2020 | Lee et al. | |
| 2020/0275116 A1* | 8/2020 | Bang | H04N 19/513 |
| 2020/0275124 A1* | 8/2020 | Ko | H04N 19/176 |
| 2021/0136395 A1 | 5/2021 | Jun et al. | |
| 2021/0203990 A1* | 7/2021 | Choi | H04N 19/159 |
| 2021/0368172 A1 | 11/2021 | Lim et al. | |

FOREIGN PATENT DOCUMENTS

| | | |
|---|---|---|
| CN | 105208393 A | 12/2015 |
| CN | 106375765 A | 2/2017 |
| CN | 106998470 A | 8/2017 |
| CN | 108347616 A | 7/2018 |
| CN | 108933941 A | 12/2018 |
| CN | 109792519 A | 5/2019 |
| KR | 20070009336 A | 1/2007 |
| WO | 2018155984 A1 | 8/2018 |

OTHER PUBLICATIONS

ITU-T Telecommunication Standardization Sector of ITU. "Series H: Audiovisual and Multimedia Systems, Infrastructure of audiovisual services-Coding of moving video, Video coding for low bit rate communication." International Telecommunication Union. H.263 (Jan. 2005). 226 pages.

ITU-T Telecommunication Standardization Sector of ITU. "Series H: Audiovisual and Multimedia Systems, Infrastructure of audiovisual services-Coding of moving video, Advanced video coding for generic audiovisual services." International Telecommunication Union. H.264 (Apr. 2017). 812 pages.

ITU-T Telecommunication Standardization Sector of ITU. "Series H: Audiovisual and Multimedia Systems Infrastructure of audiovisual services-Coding of moving video, High efficiency video coding." International Telecommunication Union. H.265 (Feb. 2018). 692 pages.

* cited by examiner

Vertical asymmetric binary split     Horizontal asymmetric binary split

Vertical quartering partition     Horizontal quartering partition

Vertical asymmetric partition 3:1

Vertical asymmetric partition 1:3

Horizontal asymmetric partition 1:3

Horizontal asymmetric partition 3:1

Vertical quartering partition

Horizontal quartering partition

PICTURE RECONSTRUCTION METHOD AND APPARATUS

CROSS-REFERENCE TO RELATED APPLICATIONS

This application is a continuation of U.S. patent application Ser. No. 17/345,295, filed on Jun. 11, 2021, which is a continuation of International Application No. PCT/CN2019/125393, filed on Dec. 13, 2019, which claims priority to Chinese Patent Application No. 201811539678.1, filed on Dec. 15, 2018 and Chinese Patent Application No. 201811585506.8, filed on Dec. 24, 2018. All of the aforementioned patent applications are hereby incorporated by reference in their entireties.

TECHNICAL FIELD

This application relates to the field of video coding technologies, and more specifically, to a picture reconstruction method and apparatus.

BACKGROUND

Digital video capabilities can be incorporated into a wide variety of apparatuses, including digital televisions, digital live broadcast systems, wireless broadcast systems, personal digital assistants (personal digital assistant, PDA), laptop or desktop computers, tablet computers, e-book readers, digital cameras, digital recording apparatuses, digital media players, video game apparatuses, video game consoles, cellular or satellite radio phones (also referred to as "smartphones"), video conferencing apparatuses, video streaming apparatuses, and the like. Digital video apparatuses implement video compression technologies, for example, video compression technologies described in standards including MPEG-2, MPEG-4, ITU-T H.263, and ITU-T H.264/MPEG-4 part 10 advanced video coding (AVC), the video coding standard H.265/high efficiency video coding (high efficiency video coding, HEVC) standard, and extensions of these standards. The video apparatuses can transmit, receive, encode, decode, and/or store digital video information more efficiently by implementing the video compression technologies.

The video compression technologies are used to perform spatial (intra-picture) prediction and/or temporal (inter-picture) prediction to reduce or remove inherent redundancy in video sequences. In block-based video coding, a video slice (namely, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of a picture, spatial prediction based on a reference sample in a neighboring block in the same picture or temporal prediction based on a reference sample in another reference picture may be used. A picture may be referred to as a frame, and a reference picture may be referred to as a reference frame.

With rapid development of the Internet and mobile communication technologies, digital videos are developing toward high definition, a high frame rate, and a high compression rate. Video formats have developed from 720P to 1080P, and even ultra-high definition digital videos of 4K×2K and 8K×4K have emerged. These high-definition videos greatly increase video coding complexity, and accordingly video compression and decompression is more time-consuming.

Therefore, how to improve video coding efficiency becomes an urgent problem to be resolved.

SUMMARY

Embodiments of this application provide a video picture coding method and apparatus, and a corresponding encoder and decoder, to improve coding performance to some extent.

According to a first aspect, an embodiment of this application provides a video decoding method, including:
  obtaining size information of a current coding unit (coding unit);
  splitting a luma block of the current coding unit into at least two luma prediction blocks based on the size information of the current coding unit; and
  predicting prediction information of the at least two luma prediction blocks to obtain prediction information of the current coding unit, where
  the splitting a luma block of the current coding unit into at least two luma prediction blocks based on the size information of the current coding unit includes:
  when both a width and a height of the current coding unit are less than or equal to X, splitting the luma block of the current coding unit in a first partition mode, where X is a positive integer, and the first partition mode includes quartering partition or asymmetric partition; or
  when both a width and a height of the current coding unit are equal to Y, splitting the luma block of the current coding unit in a quartering partition mode, where Y is a positive integer; or
  when a side length of a to-be-split side of the current coding unit is equal to A, and a side length of a non-split side of the current coding unit is equal to B, splitting the luma block of the current coding unit in a quartering partition mode, where a partition direction of the quartering partition mode is perpendicular to the to-be-split side of the current coding unit, A and B are positive integers, the side length of the to-be-split side of the current coding unit is the width of the current coding unit when the partition mode of the luma block is vertical quartering partition or vertical asymmetric partition, and the side length of the non-split side of the current coding unit is the height of the current coding unit when the partition mode of the luma block is vertical quartering partition or vertical asymmetric partition; or the side length of the to-be-split side of the current coding unit is the height of the current coding unit when the partition mode of the luma block is horizontal quartering partition or horizontal asymmetric partition, and the side length of the non-split side of the current coding unit is the width of the current coding unit when the partition mode of the luma block is horizontal quartering partition or horizontal asymmetric partition; or
  when a side length of a to-be-split side of the current coding unit is equal to C, and a side length of a non-split side of the current coding unit is equal to D, splitting the luma block of the current coding unit in a second partition mode, where the second partition mode does not include quartering partition and asymmetric partition, and a partition direction of the second partition mode is perpendicular to the to-be-split side of the current coding unit, and C and D are positive integers; or when a side length of a to-be-split side of the current coding unit is less than T, splitting the luma block of the current coding unit in a third partition mode, where a partition direction of the third partition mode is perpendicular to the to-be-split side of the current coding unit, T is a positive number, and the third partition mode includes asymmetric partition, and does not include quartering partition.

According to a second aspect, an embodiment of this application provides a video decoding method, including:

obtaining size information of a current coding unit (coding unit);

determining, based on the size information of the current coding unit, whether the current coding unit meets a condition for splitting a luma block of the current coding unit into at least two luma prediction blocks, where the condition includes at least one of the following conditions:

condition 1: a ratio of a width to a height of the current coding unit is greater than or equal to 1/N and less than or equal to N, where N is a positive number;

condition 2: a maximum side length of the current coding unit is a first threshold, and the first threshold is a positive number;

condition 3: if the luma block of the current coding unit is split into at least two luma prediction blocks, a ratio of a width to a height of the luma prediction block obtained through splitting is greater than or equal to 1/M and less than or equal to M, where M is a positive number; and the ratio of a width to a height of the luma prediction block obtained through splitting is obtained based on the size information of the current coding unit;

condition 4: if the luma block of the current coding unit is split into at least two luma prediction blocks, both a width and a height of the luma prediction block obtained through splitting are greater than or equal to a second threshold, where the second threshold is a positive integer; and the width and the height of the luma prediction block obtained through splitting are obtained based on the size information of the current coding unit; and condition 5: a minimum side length of the current coding unit is a third threshold, and if the luma block of the current coding unit is split into at least two luma prediction blocks, both a width and a height of the luma prediction block obtained through splitting are greater than or equal to a fourth threshold, where the third threshold is a positive integer and the fourth threshold is a positive integer; and the width and the height of the luma prediction block obtained through splitting are obtained based on the size information of the current coding unit;

obtaining size information of a prediction unit of the current coding unit based on a determining result; and obtaining prediction information of the current coding unit based on the size information of the prediction unit of the current coding unit.

According to a third aspect, an embodiment of this application provides a video decoding method. The method includes:

splitting a luma block of a current coding unit in a first partition mode, to obtain a luma prediction block;

obtaining a luma transform block in the first partition mode and at least one of the following modes:

mode 1: when the current coding unit is predicted in an intra prediction mode, if the first partition mode is vertical quartering partition or vertical asymmetric binary split, splitting the luma block in the vertical quartering partition mode to obtain the luma transform block;

mode 2: when the current coding unit is predicted in an intra prediction mode, if the first partition mode is horizontal quartering partition or horizontal asymmetric binary split, splitting the luma block in the horizontal quartering partition mode to obtain the luma transform block;

mode 3: when the current coding unit is predicted in an inter prediction mode, if the first partition mode is vertical quartering partition or vertical asymmetric binary split, splitting the luma block in the vertical quartering partition mode to obtain the luma transform block or using the luma block as the luma transform block; and mode 4: when the current coding unit is predicted in an inter prediction mode, if the first partition mode is horizontal quartering partition or horizontal asymmetric binary split, splitting the luma block in the horizontal quartering partition mode to obtain the luma transform block or using the luma block as the luma transform block;

obtaining residual information of the luma transform block, and obtaining prediction information of the luma prediction block; and obtaining a reconstructed block of the luma block based on the residual information and the prediction information.

According to a fourth aspect, an embodiment of this application provides a video decoding method. The method includes:

obtaining a chroma transform block of a current coding unit in at least one of the following modes:

mode 1: when the current coding unit is predicted in an intra prediction mode, using a chroma block of the current coding unit as the chroma transform block;

mode 2: when the current coding unit is predicted in an inter prediction mode, using a chroma block of the current coding unit as the chroma transform block;

mode 3: when the current coding unit is predicted in an inter prediction mode, obtaining the chroma transform block in a same partition mode as that of obtaining the luma transform block of the current coding unit; and mode 4: when the current coding unit is predicted in an inter prediction mode, if a luma block of the current coding unit is split into four luma transform blocks in a quartering partition mode, and a side length of one side of any luma transform block is E, using a chroma block of the current coding unit as the chroma transform block, where E is a positive integer;

obtaining residual information of the chroma transform block, and obtaining prediction information of a chroma prediction block of the current coding unit; and obtaining a reconstructed block of the chroma block based on the residual information and the prediction information.

According to a fifth aspect, a decoding apparatus is provided. The apparatus includes modules configured to perform the method according to any one of the first aspect, the second aspect, the third aspect, the fourth aspect, or the implementations of the first aspect, the second aspect, the third aspect, or the fourth aspect.

According to a sixth aspect, a decoder is provided. The coder includes a non-volatile memory and a processor that are coupled to each other, and the processor invokes program code stored in the memory to perform some or all steps of the method according to any one of the first aspect, the second aspect, the third aspect, the fourth aspect, or the implementations of the first aspect, the second aspect, the third aspect, or the fourth aspect.

According to a seventh aspect, a computer-readable storage medium is provided. The computer-readable storage medium stores program code, and the program code includes instructions for performing some or all steps of the method according to any one of the first aspect, the second aspect, the third aspect, the fourth aspect, or the implementations of the first aspect, the second aspect, the third aspect, or the fourth aspect.

According to an eighth aspect, a computer program product is provided. When the computer program product runs on a computer, the computer is enabled to execute instructions for performing some or all steps of the method according to any one of the first aspect, the second aspect, the third aspect, the fourth aspect, or the implementations of the first aspect, the second aspect, the third aspect, or the fourth aspect.

This application further provides a picture reconstruction method and apparatus, to reduce video coding complexity, and improve coding performance.

According to a ninth aspect, a picture reconstruction method is provided. The method includes: obtaining a prediction mode of a current coding unit, and/or obtaining a prediction partition mode of the current coding unit, where the current coding unit includes a luma coding block and a chroma coding block, and the prediction partition mode is a mode of splitting the current coding unit into prediction blocks or prediction units; obtaining a transform block of the current coding unit based on the prediction partition mode and/or the prediction mode; and generating a reconstructed picture block of the current coding unit based on the transform block.

In this embodiment of this application, the transform block of the current coding unit can be obtained based on the prediction partition mode and/or the prediction mode (a bitstream does not need to be parsed or only a small amount of information in a bitstream needs to be parsed). In this case, the reconstructed picture block of the current coding unit is generated based on the transform block, so that video coding complexity can be reduced, and coding efficiency can be improved.

Optionally, the prediction partition mode of the current coding unit can be determined based on the prediction mode. The prediction mode may include an intra prediction mode and an inter prediction mode.

With reference to the ninth aspect, in some implementations of the ninth aspect, the obtaining a transform block of the current coding unit based on the prediction partition mode and/or the prediction mode includes: splitting the current coding unit into transform blocks based on the prediction partition mode and/or the prediction mode.

In this embodiment of this application, the current coding unit can be split into transform blocks based on the prediction partition mode and/or the prediction mode (a bitstream does not need to be parsed or only a small amount of information in a bitstream needs to be parsed). Therefore, video coding complexity can be reduced, and coding efficiency can be improved.

With reference to the ninth aspect, in some implementations of the ninth aspect, the obtaining a prediction mode of a current coding unit includes: obtaining the prediction mode from a bitstream through parsing or derivation, where the prediction mode includes an intra prediction mode and an inter prediction mode.

It can be learned that the obtaining the prediction mode from a bitstream through parsing or derivation may be performed by a decoder.

Optionally, when performing the method in the ninth aspect, an encoder can directly obtain the prediction mode.

With reference to the ninth aspect, in some implementations of the ninth aspect, the obtaining a prediction partition mode of the current coding unit includes: determining, based on a size of the current coding unit, candidate prediction partition modes that are allowed to be used for the current coding unit; and determining the prediction partition mode from the candidate prediction partition modes that are allowed to be used.

In this embodiment of this application, the prediction partition mode can be determined based on the size of the current coding unit (a bitstream does not need to be parsed or only a small amount of information in a bitstream needs to be parsed). Therefore, video coding complexity can be reduced, and coding efficiency can be improved.

With reference to the ninth aspect, in some implementations of the ninth aspect, the obtaining a prediction partition mode of the current coding unit includes: determining the prediction partition mode of the current coding unit based on a size of the current coding unit.

In this embodiment of this application, the prediction partition mode can be determined directly based on the size of the current coding unit (a bitstream does not need to be parsed or only a small amount of information in a bitstream needs to be parsed). Therefore, video coding complexity can be reduced, and coding efficiency can be improved.

With reference to the ninth aspect, in some implementations of the ninth aspect, the method further includes: when the prediction mode is the intra prediction mode, splitting the luma coding block in the prediction partition mode to obtain a luma prediction block; and skipping splitting the chroma coding block, and using the chroma coding block as a chroma prediction block.

With reference to the ninth aspect, in some implementations of the ninth aspect, the method further includes: when the prediction mode is the inter prediction mode, skipping splitting the current coding unit, and using the current coding unit as a prediction unit.

In this embodiment of this application, when the prediction mode is the inter prediction mode, the current coding unit is not split, so that a coding block having an excessively small size can be avoided, and coding efficiency can be improved.

With reference to the ninth aspect, in some implementations of the ninth aspect, the method further includes: when the prediction mode is the inter prediction mode, splitting the current coding unit in any one of the following modes: splitting the luma coding block in the prediction partition mode to obtain a luma prediction block, and splitting the chroma coding block in the prediction partition mode to obtain a chroma prediction block; or splitting the luma coding block in the prediction partition mode to obtain a luma prediction block, and when there are two luma prediction blocks and a length of at least one side of at least one of the two luma prediction blocks is 4, skipping splitting the chroma coding block and using the chroma coding block as a chroma prediction block.

With reference to the ninth aspect, in some implementations of the ninth aspect, the obtaining a transform block of the current coding unit based on the prediction partition mode and/or the prediction mode includes: when the prediction mode is the intra prediction mode, and the prediction partition mode of the luma coding block is vertical quartering partition or vertical asymmetric binary split, splitting the luma coding block through vertical quartering partition to obtain a luma transform block, and skipping splitting the chroma coding block and using the chroma coding block as a chroma transform block; or when the prediction mode is an intra prediction mode, and the prediction partition mode of the luma coding block is horizontal quartering partition or horizontal asymmetric binary split, splitting the luma coding block through horizontal quartering partition to obtain a luma transform block, and skipping splitting the chroma coding block and using the chroma coding block as a chroma transform block.

In this embodiment of this application, the transform block of the current coding unit is obtained directly based on the prediction partition mode and/or the prediction mode (a bitstream does not need to be parsed or only a small amount of information in a bitstream needs to be parsed). Therefore, video coding complexity can be reduced, and coding efficiency can be improved.

With reference to the ninth aspect, in some implementations of the ninth aspect, the obtaining a transform block of the current coding unit based on the prediction partition mode and/or the prediction mode includes: when the prediction mode is the inter prediction mode, skipping splitting the current coding unit, and using the current coding unit as a transform unit.

In this embodiment of this application, the transform block of the current coding unit is obtained directly based on the prediction partition mode and/or the prediction mode (a bitstream does not need to be parsed or only a small amount of information in a bitstream needs to be parsed). Therefore, video coding complexity can be reduced, and coding efficiency can be improved.

With reference to the ninth aspect, in some implementations of the ninth aspect, the method further includes: determining whether to allow splitting of the current coding unit to obtain a prediction block when the size of the current coding unit meets at least one of the following conditions: a ratio of a width to a height of the current coding unit is less than P, where P is a positive integer; or a maximum side length of the current coding unit is equal to a preset threshold; and performing the step of obtaining the prediction partition mode of the current coding unit when it is determined that splitting of the current coding unit to obtain a prediction block is allowed.

In this embodiment of this application, it can be determined, based on the size of the current coding unit, whether to allow splitting of the current coding unit to obtain a prediction block. Therefore, video coding complexity can be reduced, and coding efficiency can be improved.

According to a tenth aspect, a picture reconstruction apparatus is provided, including: an obtaining unit, configured to obtain a prediction mode of a current coding unit, and/or obtain a prediction partition mode of the current coding unit, where the current coding unit includes a luma coding block and a chroma coding block, and the prediction partition mode is a mode of splitting the current coding unit into prediction blocks or prediction units; a processing unit, configured to obtain a transform block of the current coding unit based on the prediction partition mode and/or the prediction mode; and a reconstruction unit, configured to generate a reconstructed picture block of the current coding unit based on the transform block.

In this embodiment of this application, the transform block of the current coding unit can be obtained based on the prediction partition mode and/or the prediction mode (a bitstream does not need to be parsed or only a small amount of information in a bitstream needs to be parsed). In this case, the reconstructed picture block of the current coding unit is generated based on the transform block, so that video coding complexity can be reduced, and coding efficiency can be improved.

Optionally, the prediction partition mode of the current coding unit can be determined based on the prediction mode. The prediction mode may include an intra prediction mode and an inter prediction mode.

With reference to the tenth aspect, in some implementations of the tenth aspect, the processing unit is configured to split the current coding unit into transform blocks based on the prediction partition mode and/or the prediction mode.

In this embodiment of this application, the current coding unit can be split into transform blocks based on the prediction partition mode and/or the prediction mode. Therefore, video coding complexity can be reduced, and coding efficiency can be improved.

With reference to the tenth aspect, in some implementations of the tenth aspect, the obtaining unit is configured to obtain the prediction mode from a bitstream through parsing or derivation, where the prediction mode includes an intra prediction mode and an inter prediction mode.

It can be learned that the obtaining the prediction mode from a bitstream through parsing or derivation may be performed by a decoder.

Optionally, when performing the method in the ninth aspect, an encoder can directly obtain the prediction mode.

With reference to the tenth aspect, in some implementations of the tenth aspect, the obtaining unit is configured to: determine, based on a size of the current coding unit, candidate prediction partition modes that are allowed to be used for the current coding unit; and determine the prediction partition mode from the candidate prediction partition modes that are allowed to be used.

In this embodiment of this application, the prediction partition mode can be determined based on the size of the current coding unit (a bitstream does not need to be parsed or only a small amount of information in a bitstream needs to be parsed). Therefore, video coding complexity can be reduced, and coding efficiency can be improved.

With reference to the tenth aspect, in some implementations of the tenth aspect, the obtaining unit is configured to determine the prediction partition mode of the current coding unit based on the size of the current coding unit.

In this embodiment of this application, the prediction partition mode can be determined directly based on the size of the current coding unit (a bitstream does not need to be parsed or only a small amount of information in a bitstream needs to be parsed). Therefore, video coding complexity can be reduced, and coding efficiency can be improved.

With reference to the tenth aspect, in some implementations of the tenth aspect, the processing unit is further configured to: when the prediction mode is the intra prediction mode, split the luma coding block in the prediction partition mode to obtain a luma prediction block; and skip splitting the chroma coding block, and use the chroma coding block as a chroma prediction block.

With reference to the tenth aspect, in some implementations of the tenth aspect, the processing unit is further configured to: when the prediction mode is the inter prediction mode, skip splitting the current coding unit, and use the current coding unit as a prediction unit.

In this embodiment of this application, when the prediction mode is the inter prediction mode, the current coding unit is not split, so that a coding block having an excessively small size can be avoided, and coding efficiency can be improved.

With reference to the tenth aspect, in some implementations of the tenth aspect, the processing unit is further configured to: when the prediction mode is the inter prediction mode, split the current coding unit in any one of the following modes: splitting the luma coding block in the prediction partition mode to obtain a luma prediction block, and splitting the chroma coding block in the prediction partition mode to obtain a chroma prediction block; or splitting the luma coding block in the prediction partition mode to obtain a luma prediction block, and when there are two luma prediction blocks and a length of at least one side of at least one of the two luma prediction blocks is 4, skipping splitting the chroma coding block and using the chroma coding block as a chroma prediction block.

With reference to the tenth aspect, in some implementations of the tenth aspect, the processing unit is configured to: when the prediction mode is the intra prediction mode, and the prediction partition mode of the luma coding block is vertical quartering partition or vertical asymmetric binary split, split the luma coding block through vertical quartering partition to obtain a luma transform block, and skip splitting the chroma coding block and use the chroma coding block as a chroma transform block; or when the prediction mode is an intra prediction mode, and the prediction partition mode of the luma coding block is horizontal quartering partition or horizontal asymmetric binary split, split the luma coding block through horizontal quartering partition to obtain a luma transform block, and skip splitting the chroma coding block and use the chroma coding block as a chroma transform block.

In this embodiment of this application, the transform block of the current coding unit is obtained directly based on the prediction partition mode and/or the prediction mode (a bitstream does not need to be parsed or only a small amount of information in a bitstream needs to be parsed). Therefore, video coding complexity can be reduced, and coding efficiency can be improved.

With reference to the tenth aspect, in some implementations of the tenth aspect, the processing unit is configured to: when the prediction mode is the inter prediction mode, skip splitting the current coding unit, and use the current coding unit as a transform unit.

In this embodiment of this application, the transform block of the current coding unit is obtained directly based on the prediction partition mode and/or the prediction mode (a bitstream does not need to be parsed or only a small amount of information in a bitstream needs to be parsed). Therefore, video coding complexity can be reduced, and coding efficiency can be improved.

With reference to the tenth aspect, in some implementations of the tenth aspect, the processing unit is further configured to determine whether to allow splitting of the current coding unit to obtain a prediction block when the size of the current coding unit meets at least one of the following conditions: a ratio of a width to a height of the current coding unit is less than P, where P is a positive integer; or a maximum side length of the current coding unit is equal to a preset threshold; and perform the step of obtaining the prediction partition mode of the current coding unit when it is determined that splitting of the current coding unit to obtain a prediction block is allowed.

In this embodiment of this application, it can be determined, based on the size of the current coding unit, whether to allow splitting of the current coding unit to obtain a prediction block. Therefore, video coding complexity can be reduced, and coding efficiency can be improved.

According to an eleventh aspect, a device for decoding video data is provided. The device includes:
 a memory, configured to store video data in a bitstream form; and
 a video decoder, configured to implement some or all steps of any method according to the ninth aspect.

According to a twelfth aspect, a device for encoding video data is provided. The device includes:
 a memory, configured to store video data in a bitstream form; and
 a video encoder, configured to implement some or all steps of any method according to the ninth aspect.

According to a thirteenth aspect, an embodiment of this application provides a device for decoding video data, including a memory and a processor. The processor invokes program code stored in the memory, to perform some or all steps of any method according to the ninth aspect.

Optionally, the memory is a non-volatile memory.

Optionally, the memory and the processor are coupled to each other.

According to a fourteenth aspect, an embodiment of this application provides a computer-readable storage medium. The computer-readable storage medium stores program code, and the program code includes instructions for performing some or all steps of any method according to the ninth aspect.

According to a fifteenth aspect, an embodiment of this application provides a computer program product. When the computer program product runs on a computer, the computer is enabled to perform some or all steps of any method according to the ninth aspect.

In this embodiment of this application, the transform block of the current coding unit can be obtained based on the prediction partition mode and/or the prediction mode (a bitstream does not need to be parsed or only a small amount of information in a bitstream needs to be parsed). In this case, the reconstructed picture block of the current coding unit is generated based on the transform block, so that video coding complexity can be reduced, and coding efficiency can be improved.

DESCRIPTION OF EMBODIMENTS

Figure 1A:
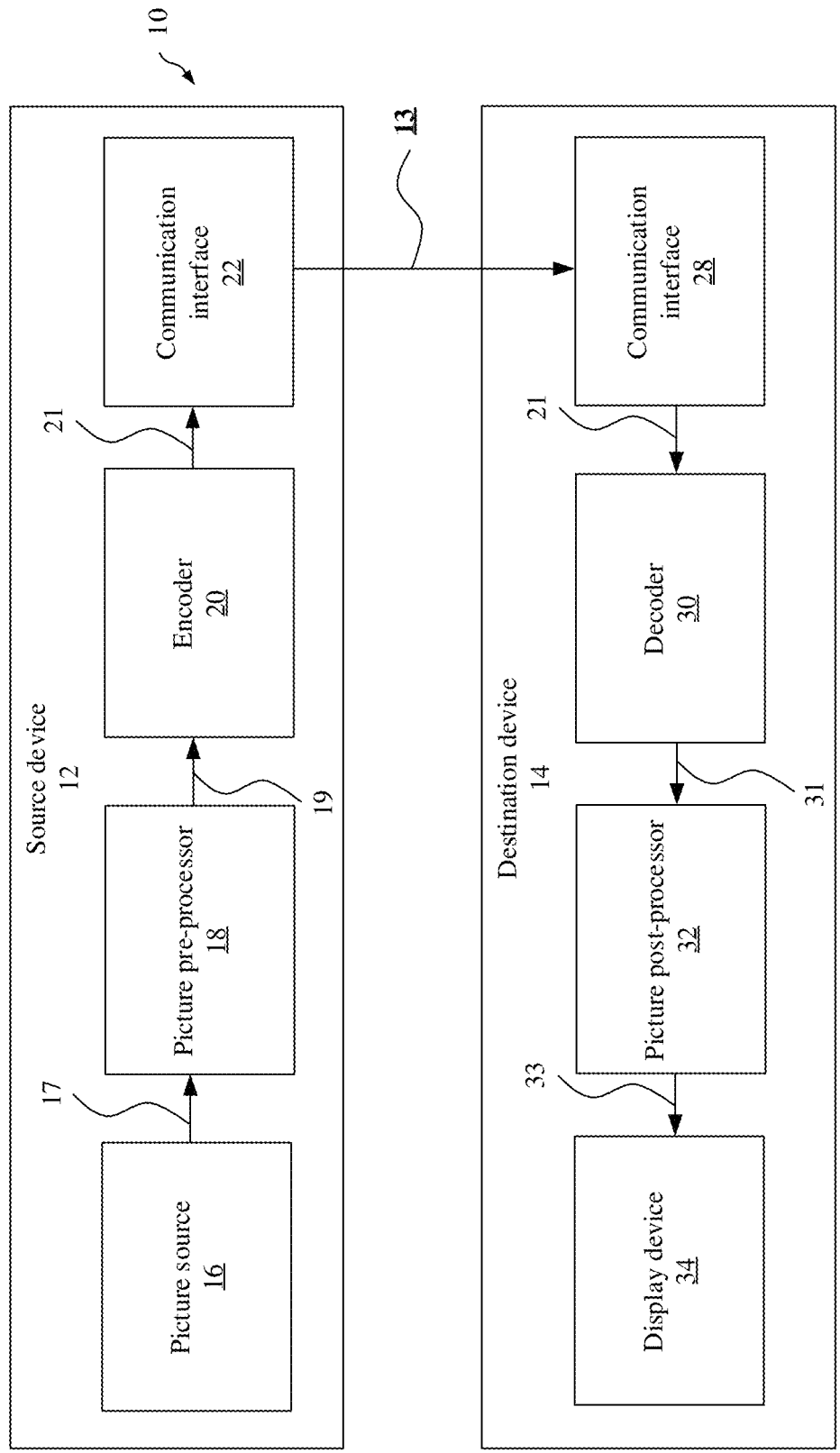
FIG. 1A is a block diagram of an example of a video coding system 10 for implementing an embodiment of the present disclosure.

The following describes the embodiments of the present disclosure with reference to the accompanying drawings in the embodiments of the present disclosure. In the following description, reference is made to the accompanying drawings that form a part of this disclosure and show, by way of illustration, specific aspects of the embodiments of the present disclosure or specific aspects in which the embodiments of the present disclosure may be used. It should be understood that the embodiments of the present disclosure may be used in other aspects, and may include structural or logical changes not depicted in the accompanying drawings. Therefore, the following detailed description shall not be understood in a limiting sense, and the scope of the present disclosure is defined by the appended claims. For example, it should be understood that disclosed content with reference to described methods may also hold true for a corresponding device or system configured to perform the method, and vice versa. For example, if one or more specific method steps are described, a corresponding device may include one or more units such as functional units for performing the described one or more method steps (for example, one unit performs the one or more steps; or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include a step used to perform one or more functionalities of one or more units (for example, one step used to perform one or more functionalities of one or more units; or a plurality of steps, each of which is used perform one or more functionalities of one or more units in a plurality of units), even if such one or more of steps are not explicitly described or illustrated in the accompanying drawings. Further, it should be understood that features of the various example embodiments and/or aspects described in this specification may be combined with each other, unless otherwise specified.

Video coding typically refers to processing of a sequence of pictures that constitute a video or a video sequence. In the field of video coding, the terms "picture (picture)", "frame (frame)", and "image (image)" may be used as synonyms. Video coding used in this specification refers to video encoding or video decoding. Video encoding is performed on a source side, and usually includes processing (for example, by compressing) an original video picture to reduce an amount of data for representing the video picture, for more efficient storage and/or transmission. Video decoding is performed on a destination side, and typically includes inverse processing in comparison with an encoder to reconstruct a video picture. "Coding" of a video picture in the embodiments should be understood as "encoding" or "decoding" of a video sequence. A combination of encoding components and decoding components is also referred to as codec (CODEC).

A video sequence includes a series of pictures (picture), a picture is further split into slices (slice), and a slice is further split into blocks (block). Video coding is performed by blocks. In some new video coding standards, the concept "block" is further extended. For example, a macro block may be further split into a plurality of prediction blocks (partition) that can be used for predictive coding. A plurality of block units are classified by functions according to basic concepts such as coding unit (coding unit, CU), prediction unit (prediction unit, PU), and transform unit (transform unit, TU), and are described by using a new tree-based structure. For example, a CU may be split into smaller CUs through quadtree split, and the smaller CU may further be split, to generate a quadtree structure. The CU is a basic unit for splitting and encoding a coding picture. A PU and a TU also have similar tree structures. The PU may correspond to a prediction block, and is a basic unit for predictive coding. The CU is further partitioned into a plurality of PUs in a partitioning pattern. The TU may correspond to a transform block, and is a basic unit for transforming a prediction residual. However, all of the CU, the PU, and the TU are concepts of blocks (or picture blocks) in essence.

A CTU is split into a plurality of CUs by using a quadtree structure represented as a coding tree. A decision on whether to encode a picture area by using inter-picture (temporal) or intra-picture (spatial) prediction is made at a CU level. Each CU may further be split into one, two, or four PUs based on a PU splitting pattern. In one PU, a same prediction process is applied, and related information is transmitted to a decoder on a PU basis. After obtaining a residual block by applying the prediction process based on the PU splitting pattern, the CU may be partitioned into transform units (transform unit, TU) based on another quadtree structure similar to the coding tree used for the CU. In the latest development of video compression technologies, a quadtree plus binary tree (Quad-tree and binary tree, QTBT) partition frame is used to split a coding block. In a QTBT block structure, the CU may be square or rectangular.

In this specification, for ease of description and understanding, a to-be-encoded picture block in a current coded picture may be referred to as a current block. For example, in encoding, the current block is a block that is currently being encoded; and in decoding, the current block is a block that is currently being decoded. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sample value, or a sample signal in the prediction block. For example, after a plurality of reference blocks are traversed, an optimal reference block is found. The optimal reference block provides prediction for the current block, and this block is referred to as a prediction block.

In a case of lossless video coding, original video pictures can be reconstructed, and this means that reconstructed video pictures have same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed on a decoder side. This means that quality of reconstructed video pictures is lower or poorer than that of the original video pictures.

Several H.261 video coding standards are used for "lossy hybrid video codecs" (namely, spatial and temporal prediction in a sample domain is combined with 2D transform coding for applying quantization in a transform domain). Each picture of a video sequence is usually partitioned into a set of non-overlapping blocks, and coding is usually performed at a block level. In other words, on an encoder side, a video is usually processed, that is, encoded, at a block (video block) level. For example, a prediction block is generated through spatial (intra-picture) prediction and temporal (inter-picture) prediction, the prediction block is subtracted from a current block (a block that is currently being processed or to be processed) to obtain a residual block, and the residual block is transformed in the transform domain and quantized to reduce an amount of data that is to be transmitted (compressed). On the decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, subsequent blocks.

The following describes a system architecture to which the embodiments of the present disclosure are applied. FIG. 1A is a schematic block diagram of an example of a video coding system 10 to which an embodiment of the present disclosure is applied. As shown in FIG. 1A, the video coding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a "smartphone", a television, a camera, a display apparatus, a digital media player, a video game console, an in-vehicle computer, a wireless communication device, and the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

A communication connection between the source device 12 and the destination device 14 may be implemented over a link 13, and the destination device 14 may receive encoded video data from the source device 12 over the link 13. The link 13 may include one or more media or apparatuses capable of moving the encoded video data from the source device 12 to the destination device 14. In an example, the link 13 may include one or more communication media that enable the source device 12 to directly transmit the encoded video data to the destination device 14 in real time. In this example, the source device 12 may modulate the encoded video data according to a communication standard (for example, a wireless communication protocol), and may transmit modulated video data to the destination device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20, and optionally, the source device 12 may further include a picture source 16, a picture pre-processor 18, and a communication interface 22. In a specific implementation form, the encoder 20, the picture source 16, the picture preprocessor 18, and the communication interface 22 may be hardware components in the source device 12, or may be software programs in the source device 12. Separate descriptions are as follows.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (virtual reality, VR) picture); and/or any combination thereof (for example, an augmented reality (augmented reality, AR) picture). The picture source 16 may be a camera for capturing a picture or a memory for storing a picture. The picture source 16 may further include any type of (internal or external) interface through which a previously captured or generated picture is stored and/or a picture is obtained or received. When the picture source 16 is a camera, the picture source 16 may be, for example, a local camera or a camera integrated into the source device. When the picture source 16 is a memory, the picture source 16 may be, for example, a local memory or a memory integrated into the source device. When the picture source 16 includes an interface, the interface may be, for example, an external interface for receiving a picture from an external video source. The external video source is, for example, an external picture capture device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. A quantity of samples in horizontal and vertical directions (or axes) of the array or the picture defines a size and/or a resolution of the picture. For representation of a color, typically three color components are employed. For example, the picture may be represented as or include three sample arrays. For example, in an RGB format or a color space, a picture includes corresponding red, green, and blue sample arrays. However, in video coding, each pixel is typically represented in a luminance/chrominance format or a color space. For example, a picture in a YUV format includes a luminance component indicated by Y (sometimes L is used instead) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). A picture in an RGB format may be converted or transformed into a picture in the YUV format and vice versa, and such a process is also known as color transformation or conversion. If a picture is monochrome, the picture may include only a luma sample array. In this embodiment of the present disclosure, a picture transmitted by the picture source 16 to a picture processor may also be referred to as original picture data 17.

The picture pre-processor 18 is configured to receive the original picture data 17 and pre-process the original picture data 17, to obtain a pre-processed picture 19 or pre-processed picture data 19. For example, the pre-processing performed by the picture pre-processor 18 may include trimming, color format conversion (for example, from an RGB format to a YUV format), color correction, or denoising.

The encoder 20 (also referred to as a video encoder 20) is configured to receive the pre-processed picture data 19, and process the pre-processed picture data 19 by using a related prediction mode (such as a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of the method described in the present disclosure.

The communication interface 22 may be configured to receive the encoded picture data 21, and transmit the encoded picture data 21 to the destination device 14 or any other device (for example, a memory) over the link 13 for storage or direct reconstruction. The any other device may be any device used for decoding or storage. The communication interface 22 may be, for example, configured to package the encoded picture data 21 into an appropriate format, for example, a data packet, for transmission over the link 13.

The destination device 14 includes a decoder 30, and optionally, the destination device 14 may further include a communication interface 28, a picture post-processor 32, and a display device 34. Separate descriptions are as follows.

The communication interface 28 may be configured to receive the encoded picture data 21 from the source device 12 or any other source. The any other source is, for example, a storage device. The storage device is, for example, an encoded picture data storage device. The communication interface 28 may be configured to transmit or receive the encoded picture data 21 over the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communication interface 28 may be, for example, configured to depackage the data packet transmitted through the communication interface 22, to obtain the encoded picture data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded picture data transmission.

The decoder 30 (also referred to as the decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of the method described in the present disclosure.

The picture post-processor 32 is configured to post-process the decoded picture data 31 (also referred to as reconstructed picture data), to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid crystal display (liquid crystal display, LCD), an organic light emitting diode (organic light emitting diode, OLED) display, a plasma display, a projector, a micro LED display, a liquid crystal on silicon (liquid crystal on silicon, LCoS), a digital light processor (digital light processor, DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

As will be apparent for a person skilled in the art based on the descriptions, existence and (exact) split of functionalities of the different units or functionalities of the source device 12 and/or the destination device 14 shown in FIG. 1A may vary depending on an actual device and application. The source device 12 and the destination device 14 each may be any one of a wide range of devices, including any type of handheld or stationary device, for example, a notebook or laptop computer, a mobile phone, a smartphone, a pad or a tablet computer, a video camera, a desktop computer, a set-top box, a television, a camera, a vehicle-mounted device, a display device, a digital media player, a video game console, a video streaming device (such as a content service server or a content distribution server), a broadcast receiver device, or a broadcast transmitter device, and may not use or may use any type of operating system.

The encoder 20 and the decoder 30 each may be implemented as any one of various appropriate circuits, for example, one or more microprocessors, digital signal processors (digital signal processor, DSP), application-specific integrated circuits (application-specific integrated circuit, ASIC), field-programmable gate arrays (field-programmable gate array, FPGA), discrete logic, hardware, or any combinations thereof. If the technologies are implemented partially by using software, a device may store software instructions in an appropriate non-transitory computer-readable storage medium and may execute the instructions by using hardware such as one or more processors, to perform the technologies of this disclosure. Any one of the foregoing content (including hardware, software, a combination of hardware and software, and the like) may be considered as one or more processors.

In some cases, the video coding system 10 shown in FIG. 1A is merely an example and the techniques of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode and store data in the memory, and/or a video decoding device may retrieve and decode data from the memory. In some examples, the encoding and the decoding are performed by devices that do not communicate with one another, but simply encode data to the memory and/or retrieve and decode data from the memory.

Figure 1B:
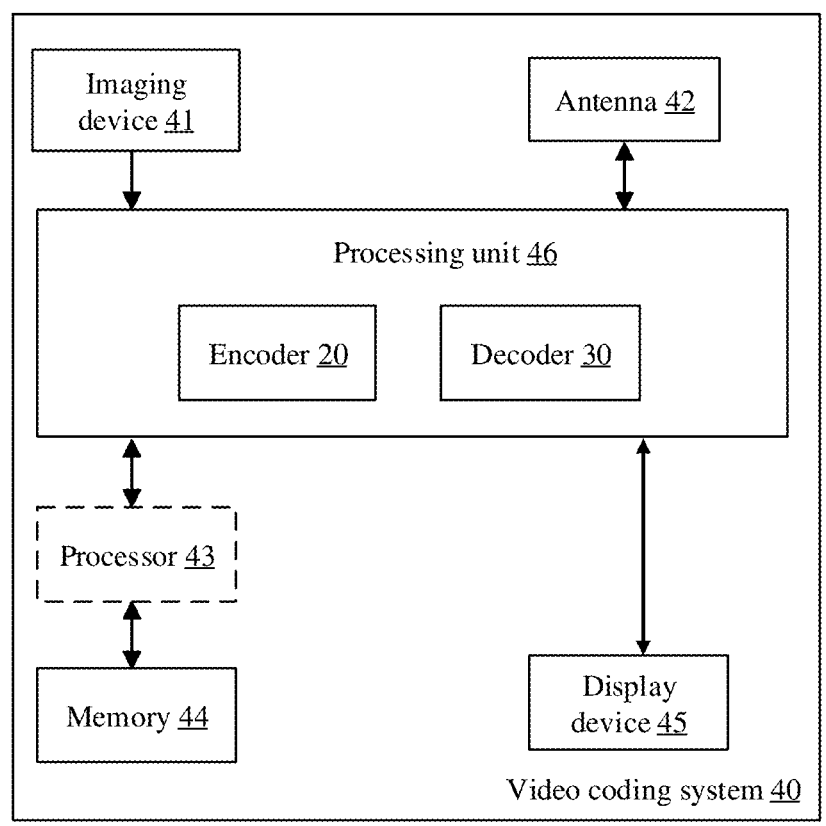
FIG. 1B is a block diagram of an example of a video coding system 40 for implementing an embodiment of the present disclosure.
Figure 2:
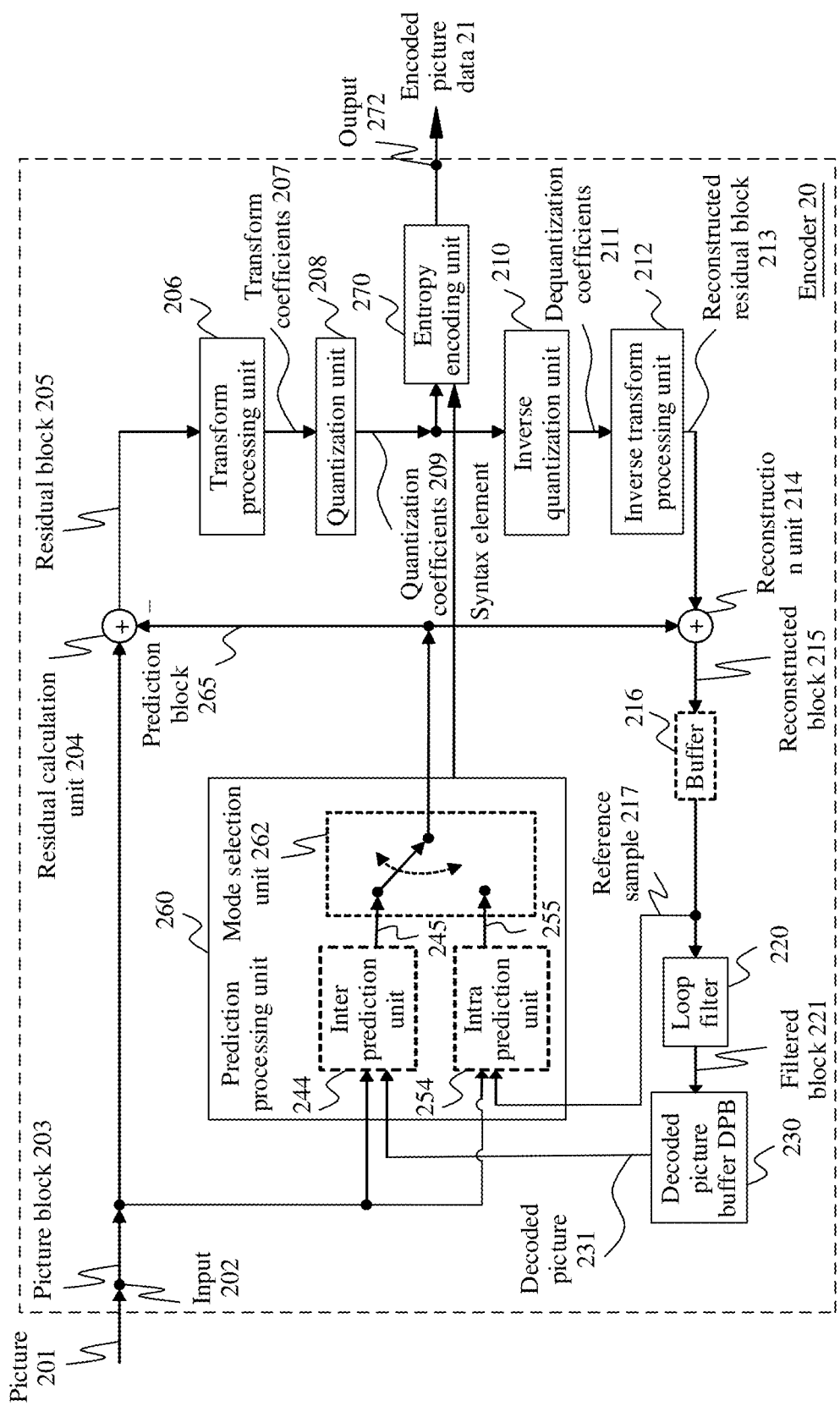
FIG. 2 is a block diagram of an example structure of an encoder 20 for implementing an embodiment of the present disclosure.
Figure 3:
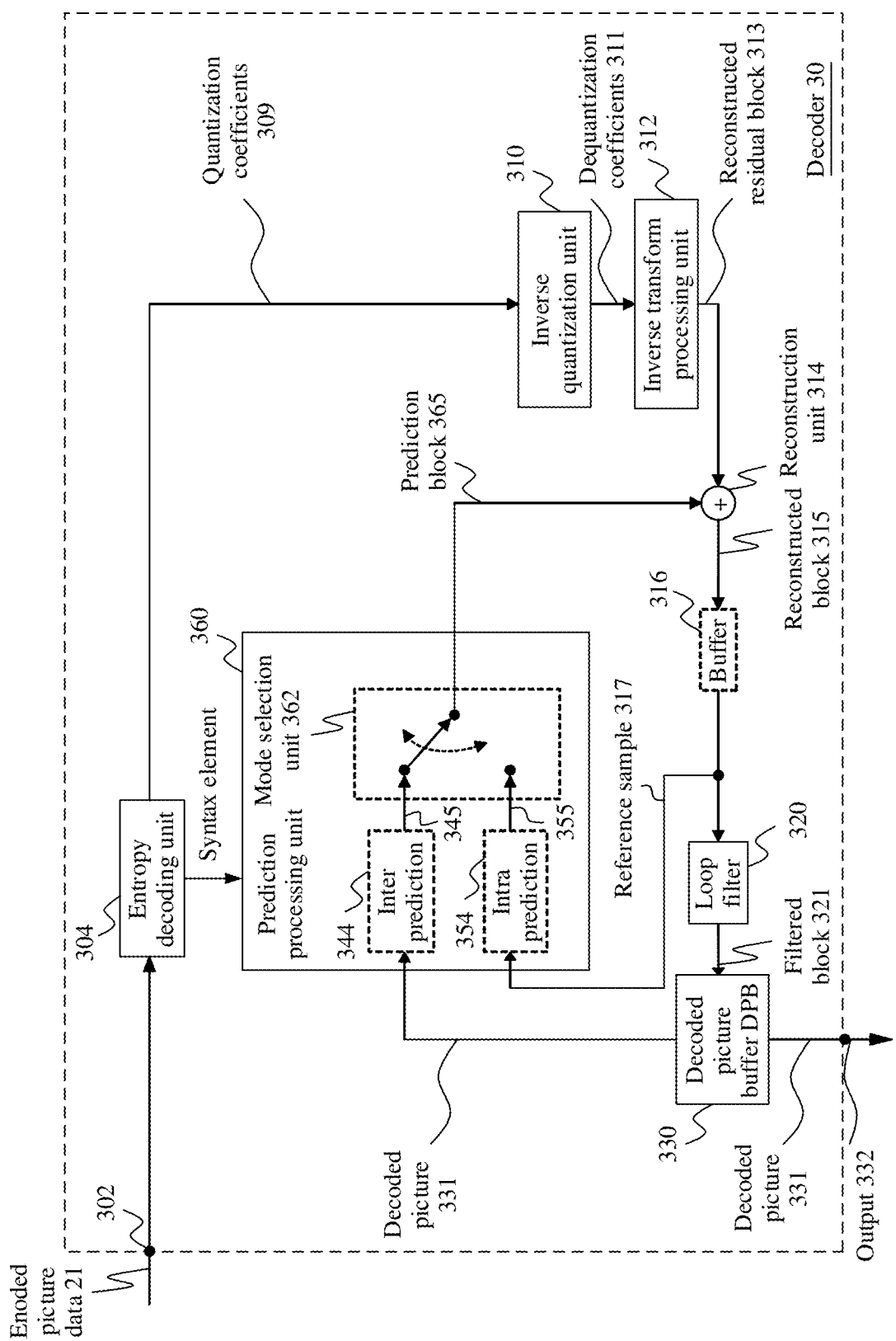
FIG. 3 is a block diagram of an example structure of a decoder 30 for implementing an embodiment of the present disclosure.

FIG. 1B is an illustrative diagram of an example of a video coding system 40, including the encoder 20 in FIG. 2 and/or the decoder 30 in FIG. 3, according to an example embodiment. The video coding system 40 can implement a combination of various techniques in the embodiments of the present disclosure. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

In FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include an application-specific integrated circuit (application-specific integrated circuit, ASIC) logic, a graphics processor, a general-purpose processor, or the like. The video coding system 40 may also include the optional processor 43. The optional processor 43 may similarly include an application-specific integrated circuit (application-specific integrated circuit, ASIC) logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (Static Random Access Memory, SRAM), a dynamic random access memory (Dynamic Random Access Memory, DRAM)), or a non-volatile memory (for example, a flash memory). In a non-restrictive example, the memory 44 may be implemented by a cache memory. In some examples, the logic circuit 47 may access the memory 44 (for example, for implementing a picture buffer). In other examples, the logic circuit 47 and/or the processing unit 46 may include a memory (for example, a cache) for implementing a picture buffer.

In some examples, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by a processing unit 2820 or the memory 44) and a graphics processing unit (which is implemented by, for example, the processing unit 46). The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame coding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of the present disclosure, for the example described with reference to the encoder 20, the decoder 30 may be configured to perform an inverse process. With regard to a signaling syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that the decoding method described in this embodiment of the present disclosure is mainly used in a decoding process, and the process exists on both the encoder 20 and the decoder 30.

FIG. 2 is a schematic/conceptual block diagram of an example encoder 20 configured to implement an embodiment of the present disclosure. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (decoded picture buffer, DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not depicted in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (decoded picture buffer, DPB) 230, and the prediction processing unit 260 form a reverse signal path of the encoder. The reverse signal path of the encoder corresponds to a signal path of a decoder (refer to the decoder 30 in FIG. 3).

The encoder 20 receives, for example, from an input 202, a picture 201 or a picture block 203 of the picture 201, for example, a picture in a sequence of pictures forming a video or a video sequence. The picture block 203 may also be referred to as a current picture block or a to-be-encoded picture block. The picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

In an embodiment, the encoder 20 may include a partitioning unit (not depicted in FIG. 2), configured to partition the picture 201 into a plurality of blocks such as the picture blocks 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning techniques described above.

Like the picture 201, the picture block 203 is also or may be considered as a two-dimensional array or matrix of samples with sample values, although of a smaller size than the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the picture block 203 defines a size of the picture block 203.

The encoder 20 shown in FIG. 2 is configured to encode the picture 201 block by blocks, for example, the encoder encodes and predicts each picture block 203.

The residual calculation unit 204 is configured to calculate a residual block 205 based on the picture block 203 and a prediction block 265 (further details about the prediction block 265 are provided below), for example, obtain the residual block 205 in a sample domain by subtracting sample values of the prediction block 265 from sample values of the picture block 203 sample by sample (pixel by pixel).

The transform processing unit 206 is configured to apply a transform, for example, a discrete cosine transform (discrete cosine transform, DCT) or a discrete sine transform (discrete sine transform, DST), on sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply an integer approximation of DCT/DST, such as transforms specified in AVS, AVS2, and AVS3. In comparison with an orthogonal DCT transform, such an integer approximation is typically scaled by a factor. To preserve a norm of a residual block which is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. Specific scaling factors are, for example, specified for the inverse transform, for example, by the inverse transform processing unit 212 on the decoder side 30 (and the corresponding inverse transform, for example, by the inverse transform processing unit 212 on the encoder side 20), and corresponding scaling factors for the forward transform, for example, by the transform processing unit 206 on the encoder side 20 may be specified accordingly.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. The quantization process may reduce a bit depth associated with some or all of the transform coefficients 207. For example, an n-bit transform coefficient may be rounded down to an m-bit transform coefficient during quantization, where n is greater than m. A quantization degree may be modified by adjusting a quantization parameter (quantization parameter, QP). For example, for scalar quantization, different scales may be applied to achieve finer or coarser quantization. A smaller quantization step corresponds to finer quantization, and a larger quantization step corresponds to coarser quantization. An applicable quantization step may be indicated by the quantization parameter (quantization parameter, QP). The quantization parameter may be, for example, an index of a predefined set of applicable quantization steps. For example, a smaller quantization parameter may correspond to finer quantization (a smaller quantization step) and a larger quantization parameter may correspond to coarser quantization (a larger quantization step) or vice versa. The quantization may include division by a quantization step and corresponding quantization and/or inverse quantization, for example, performed by the inverse quantization unit 210, or may include multiplication by a quantization step. In embodiments according to some standards such as AVS, AVS2, and AVS3, a quantization parameter may be used to determine the quantization step. Generally, the quantization step may be calculated based on a quantization parameter using a fixed point approximation of an equation including division. An additional scaling factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where loss increases with an increasing quantization step.

The inverse quantization unit 210 is configured to apply inverse quantization of the quantization unit 208 to quantization coefficients to obtain dequantization coefficients 211, for example, apply, based on or by using a same quantization step as the quantization unit 208, inverse of a quantization scheme applied by the quantization unit 208. The dequantization coefficients 211 may also be referred to as dequantized residual coefficients 211 and correspond, although typically not identical to the transform coefficients due to the loss by quantization, to the transform coefficients 207.

The inverse transform processing unit 212 is configured to apply an inverse transform of the transform applied by the transform processing unit 206, for example, an inverse discrete cosine transform (discrete cosine transform, DCT) or an inverse discrete sine transform (discrete sine transform, DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (namely, a reconstructed residual block 213) to the prediction block 265 to obtain a reconstructed block 215 in a sample domain, for example, by adding a sample value of the reconstructed residual block 213 and the sample value of the prediction block 265.

Optionally, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value stored in the buffer unit 216 for any type of estimation and/or prediction, for example, intra prediction.

For example, in an embodiment, the encoder 20 may be configured so that the buffer unit 216 is not only used for storing the reconstructed block 215 for the intra prediction unit 254 but also used for the loop filter unit 220 (not depicted in FIG. 2), and/or so that, for example, the buffer unit 216 and the decoded picture buffer unit 230 form one buffer. In other embodiments, a filtered block 221 and/or a block or a sample from the decoded picture buffer 230 (the block or sample is not depicted in FIG. 2) are/is used as an input or a basis for the intra prediction unit 254.

The loop filter unit 220 (briefly referred to as a "loop filter" 220) is configured to filter the reconstructed block 215 to obtain the filtered block 221, to smooth pixel transition or improve video quality. The loop filter unit 220 is intended to represent one or more loop filters such as a deblocking filter, a sample-adaptive offset (sample-adaptive offset, SAO) filter, or another filter such as a bilateral filter, an adaptive loop filter (adaptive loop filter, ALF), a sharpening or smoothing filter, or a collaborative filter. Although the loop filter unit 220 is shown in FIG. 2 as an in-loop filter, in other configurations, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 can receive the same loop filter parameter and apply the same loop filter parameter to decoding.

The decoded picture buffer (decoded picture buffer, DPB) 230 may be a reference picture memory that stores reference picture data for use in encoding video data by the encoder 20. The DPB 230 may be formed by any one of a variety of memory devices, such as a dynamic random access memory (dynamic random access memory, DRAM) (including a synchronous DRAM (synchronous DRAM, SDRAM), a magnetoresistive RAM (magnetoresistive RAM, MRAM), and a resistive RAM (resistive RAM, RRAM)), or another type of memory devices. The DPB 230 and the buffer 216 may be provided by a same memory device or separate memory devices. In an example, the decoded picture buffer (decoded picture buffer, DPB) 230 is configured to store the filtered block 221. The decoded picture buffer 230 may be further configured to store another previously filtered block, for example, the previously reconstructed and filtered block 221, of a same current picture or of different pictures, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (decoded picture buffer, DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of a same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra prediction mode or an inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260). The prediction mode provides an optimal match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (rate distortion optimization, RDO), that is, select a prediction mode that provides minimum rate-distortion optimization or select a prediction mode for which related rate distortion at least satisfies a prediction mode selection criterion.

In the following, prediction processing (for example, performed the prediction processing unit 260) and mode selection (for example, performed the mode selection unit 262) performed by the example encoder 20 are to be explained in detail.

As described above, the encoder 20 is configured to determine or select the optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (namely, for example, at least some decoded pictures stored in the DPB 230, as described above) and other inter prediction parameters, for example, depends on whether an entire reference picture or only a part of the reference picture, for example, a search window region around a region of a current block, is used for searching for an optimal matched reference block, and/or for example, depends on whether pixel interpolation such as half-pixel and/or quarter-pixel interpolation is applied. The set of inter prediction modes may include, for example, an advanced motion vector prediction (Advanced Motion Vector Prediction, AMVP) mode and a merge (merge) mode. In specific implementation, the set of inter prediction modes may include a refined control point-based AMVP mode and a refined control point-based merge mode in the embodiments of the present disclosure. In an example, the intra prediction unit 254 may be configured to perform any combination of inter prediction techniques described below.

In addition to the foregoing prediction modes, a skip mode and/or a direct mode may also be applied in the embodiments of the present disclosure.

The prediction processing unit 260 may be further configured to partition the picture block 203 into smaller block partitions or subblocks, for example, by iteratively using quadtree (quad-tree, QT) partitioning, binary tree (binary-tree, BT) partitioning, triple tree (triple-tree, TT) partitioning, extended quadtree (EQT, Extended Quad-Tree), or any combination thereof, and perform, for example, prediction on each of the block partitions or subblocks. Mode selection includes selection of a tree structure of the partitioned picture block 203 and selection of a prediction mode applied to each of the block partitions or subblocks.

The inter prediction unit 244 may include a motion estimation (motion estimation, ME) unit (not depicted in FIG. 2) and a motion compensation (motion compensation, MC) unit (not depicted in FIG. 2). The motion estimation unit is configured to receive or obtain the picture block 203 (the current picture block 203 of the current picture 201) and the decoded pictures 231, or at least one or more previously reconstructed blocks, for example, one or more reconstructed blocks of one or more other/different previously decoded pictures 231, for motion estimation. For example, a video sequence may include the current picture and a previously decoded picture 31. In other words, the current picture and the previously decoded picture 31 may be a part of a sequence of pictures forming a video sequence or form the sequence of pictures.

For example, the encoder 20 may be configured to select a reference block from a plurality of reference blocks of a same picture or different pictures in a plurality of other pictures and provide, for a motion estimation unit (not depicted in FIG. 2), a reference picture and/or provide an offset (a spatial offset) between a location (coordinates X and Y) of the reference block and a location of the current block as an inter prediction parameter. This offset is also referred to as a motion vector (motion vector, MV).

The motion compensation unit is configured to obtain the inter prediction parameter, and perform inter prediction based on or by using the inter prediction parameter, to obtain the inter prediction block 245. Motion compensation performed by the motion compensation unit (not depicted in FIG. 2) may include extracting or generating a prediction block based on a motion/block vector determined through motion estimation (interpolation may be performed at a sub-sample precision level). Interpolation filtering may generate additional pixel samples from known pixel samples, thereby potentially increasing a quantity of candidate prediction blocks that may be used to code a picture block. Upon receiving a motion vector for a PU of the current picture block, the motion compensation unit 246 may locate a prediction block to which the motion vector points in one of reference picture lists. The motion compensation unit 246 may further generate a syntax element associated with a block and a video slice, for use by the decoder 30 in decoding a picture block of the video slice.

The inter prediction unit 244 may transmit a syntax element to the entropy encoding unit 270, where the syntax element includes an inter prediction parameter (for example, indication information of an inter prediction mode that is selected for prediction of the current block after a plurality of inter prediction modes are traversed). In a possible application scenario, if there is only one inter prediction mode, the inter prediction parameter may alternatively not be carried in the syntax element. In this case, the decoder side 30 may directly perform decoding in a default prediction mode. It can be understood that the inter prediction unit 244 may be configured to perform any combination of inter prediction techniques.

The intra prediction unit 254 is configured to obtain, for example, receive, a picture block 203 (the current picture block) and one or more previously reconstructed blocks, for example, reconstructed neighboring blocks, of a same picture for intra estimation. The encoder 20 may be, for example, configured to select an intra prediction mode from a plurality of (predetermined) intra prediction modes.

In an embodiment, the encoder 20 may be configured to select an intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter of the selected intra prediction mode. In any case, after selecting the intra prediction mode for a block, the intra prediction unit 254 is further configured to provide the intra prediction parameter, that is, information indicating the selected intra prediction mode for the block, to the entropy encoding unit 270. In an example, the intra prediction unit 254 may be configured to perform any combination of intra prediction techniques.

The intra prediction unit 254 may transmit a syntax element to the entropy encoding unit 270, where the syntax element includes an intra prediction parameter (for example, indication information of an intra prediction mode that is selected for prediction of the current block after a plurality of intra prediction modes are traversed). In a possible application scenario, if there is only one intra prediction mode, the intra prediction parameter may alternatively not be carried in the syntax element. In this case, the decoder side 30 may directly perform decoding in a default prediction mode.

The entropy encoding unit 270 is configured to apply (or bypass) an entropy encoding algorithm or a scheme (for example, a variable length coding (variable length coding, VLC) scheme, a context adaptive VLC (context adaptive VLC, CAVLC) scheme, an arithmetic coding scheme, a context adaptive binary arithmetic coding (context adaptive binary arithmetic coding, CABAC), syntax-based context-adaptive binary arithmetic coding (syntax-based context-adaptive binary arithmetic coding, SBAC), probability interval partitioning entropy (probability interval partitioning entropy, PIPE) coding, or another entropy coding methodology or technique) on one or all of the following: the quantization coefficients 209, the inter prediction parameter, the intra prediction parameter, and/or the loop filter parameter, to obtain the encoded picture data 21 which can be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice being encoded.

Other structural variations of the video encoder 20 may be configured to encode a video stream. For example, a non-transform based encoder 20 may quantize a residual signal directly without the transform processing unit 206 for some blocks or frames. In another implementation, the encoder 20 includes the quantization unit 208 and the inverse quantization unit 210 that can be combined into a single unit.

In this embodiment of the present disclosure, the encoder 20 can be configured to implement a video encoding method described in the following embodiment.

It should be understood that other structural variations of the video encoder 20 may be configured to encode a video stream. For example, for some picture blocks or picture frames, the video encoder 20 may quantize the residual signal directly without processing by the transform processing unit 206, and correspondingly, without processing by the inverse transform processing unit 212. Alternatively, for some picture blocks or picture frames, the video encoder 20 does not generate residual data, and correspondingly, there is no need for the transform processing unit 206, the quantization unit 208, the inverse quantization unit 210, and the inverse transform processing unit 212 to perform processing. Alternatively, the video encoder 20 may directly store a reconstructed picture block as a reference block, without processing by the filter 220. Alternatively, the quantization unit 208 and the inverse quantization unit 210 in the video encoder 20 may be combined together. The loop filter 220 is optional. In a case of lossless compression encoding, the transform processing unit 206, the quantization unit 208, the inverse quantization unit 210, and the inverse transform processing unit 212 are optional. It should be understood that in different application scenarios, the inter prediction unit 244 and the intra prediction unit 254 may be used selectively.

FIG. 3 is a schematic/conceptual block diagram of an example decoder 30 configured to implement an embodiment of the present disclosure. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and associated syntax elements.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, quantization coefficients 309 and/or decoded encoding parameters (not depicted in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in functions, and the intra prediction unit 354 may resemble the intra prediction unit 254 in functions. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is coded as an intra coded (I) slice, the intra prediction unit 354 of the prediction processing unit 360 is configured to generate a prediction block 365 for a picture block of the current video slice based on a signaled intra prediction mode and data that is from a previously decoded block of a current frame or picture. When a video frame is coded as an inter-coded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one of reference pictures in one reference picture list. The video decoder 30 may construct reference frame lists: a list 0 and a list 1, by using a default construction technique based on reference pictures stored in the DPB 330.

The prediction processing unit 360 is configured to determine prediction information for the video block of the current video slice by parsing the motion vector and the another syntax element, and use the prediction information to generate a prediction block for the current video block that is being decoded. In an example of the present disclosure, the prediction processing unit 360 determines, by using some received syntax elements, a prediction mode (for example, intra prediction or inter prediction) for encoding the video block in the video slice, an inter prediction slice type (for example, a B slice, a P slice, or a GPB slice), construction information of one or more of the reference picture lists for the slice, a motion vector of each inter encoded video block in the slice, an inter prediction status of each inter encoded video block in the slice, and other information, to decode the video block in the current video slice. In another example of this disclosure, the syntax elements received by the video decoder 30 from a bitstream include syntax elements in one or more of an adaptive parameter set (adaptive parameter set, APS), a sequence parameter set (sequence parameter set, SPS), a picture parameter set (picture parameter set, PPS), or a slice header.

The inverse quantization unit 310 may be configured to inverse quantize (namely, dequantize) a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to the transform coefficient to generate a residual block in a pixel domain.

The reconstruction unit 314 (for example, the summer 314) is configured to add an inverse transform block 313 (namely, a reconstructed residual block 313) to the prediction block 365 to obtain a reconstructed block 315 in a sample domain, for example, by adding a sample value of the reconstructed residual block 313 and a sample value of the prediction block 365.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering techniques described below. The loop filter unit 320 is intended to represent one or more loop filters such as a deblocking filter, a sample-adaptive offset (sample-adaptive offset, SAO) filter, or another filter such as a bilateral filter, an adaptive loop filter (adaptive loop filter, ALF), a sharpening or smoothing filter, or a collaborative filter. Although the loop filter unit 320 is shown in FIG. 3 as an in-loop filter, in other configurations, the loop filter unit 320 may be implemented as a post-loop filter.

A decoded video block 321 in a given frame or picture is then stored in the decoded picture buffer 330 that stores a reference picture used for subsequent motion compensation.

The decoder 30 is configured to, for example, output the decoded picture 31 through an output 332, for presentation to a user or viewing by a user.

Other variations of the video decoder 30 may be configured to decode a compressed bitstream. For example, the decoder 30 may generate an output video stream without the loop filter unit 320. For example, a non-transform based decoder 30 may inversely quantize a residual signal directly without the inverse transform processing unit 312 for some blocks or frames. In another implementation, the video decoder 30 includes the inverse quantization unit 310 and the inverse transform processing unit 312 that can be combined into a single unit.

In this embodiment of the present disclosure, the decoder 30 is configured to implement a video decoding method described in the following embodiment.

It should be understood that other structural variations of the video decoder 30 may be configured to decode the encoded video bitstream. For example, the video decoder 30 may generate an output video stream without processing performed by the filter 320. Alternatively, for some picture blocks or picture frames, the entropy decoding unit 304 of the video decoder 30 does not obtain quantization coefficients through decoding, and correspondingly, there is no need for the inverse quantization unit 310 and the inverse transform processing unit 312 to perform processing. The loop filter 320 is optional. In a case of lossless compression, the inverse quantization unit 310 and the inverse transform processing unit 312 are optional. It should be understood that in different application scenarios, the inter prediction unit and the intra prediction unit may be used selectively.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector of a control point of the current picture block or a motion vector of a subblock of the current picture block derived from a motion vector of a neighboring affine coded block may be further processed. This is not limited in this application. For example, a value of a motion vector is restricted to be within a specific bit width range. Assuming that an allowed bit width of a motion vector is bitDepth, a value of the motion vector ranges from −2^(bitDepth−1) to 2^(bitDepth−1)−1, where the symbol "^" represents exponentiation. If bitDepth is 16, the value range is from −32768 to 32767. If bitDepth is 18, the value ranges from −131072 to 131071. For another example, values of motion vectors (for example, motion vectors MVs of four 4×4 subblocks in an 8×8 picture block) are restricted, so that a maximum difference between integer parts of the MVs of the four 4×4 subblocks does not exceed N pixels, for example, does not exceed one pixel.

The following two manners may be used to restrict the motion vector to be within a specific bit width:

Manner 1: An overflow most significant bit of the motion vector is removed:

$$ux = \left(vx + 2^{bitDepth}\right) \% 2^{bitDepth}$$

$$vx = \left(ux >= 2^{bitDepth-1}\right) ? \left(ux - 2^{bitDepth}\right) : ux$$

$$uy = \left(vy + 2^{bitDepth}\right) \% 2^{bitDepth}$$

$$vy = \left(uy >= 2^{bitDepth-1}\right) ? \left(uy - 2^{bitDepth}\right) : uy$$

vx represents a horizontal component of the motion vector of the picture block or the subblock of the picture block. vy represents a vertical component of the motion vector of the picture block or the subblock of the picture block. ux and uy are intermediate values. bitDepth represents a bit depth.

For example, a value of vx is −32769, and 32767 is derived according to the foregoing formulas. A value is stored in a computer in a two's complement representation, a two's complement representation of −32769 is 1, 0111, 1111, 1111, 1111 (17 bits), and processing performed by the computer for overflowing is discarding a most significant bit. Therefore, a value of vx is 0111, 1111, 1111, 1111, that is, 32767. This value is consistent with the result derived through processing according to the formulas.

Manner 2: Clipping is performed on the motion vector, as shown in the following formulas:

$$vx = Clip3\left(-2^{bitDepth-1}, 2^{bitDepth-1} - 1, vx\right)$$

$$vy = Clip3\left(-2^{bitDepth-1}, 2^{bitDepth-1} - 1, vy\right)$$

vx represents a horizontal component of the motion vector of the picture block or the subblock of the picture block. vy represents a vertical component of the motion vector of the picture block or the subblock of the picture block. x, y, and z correspond to three input values of an MV clamping process clip3. Clip3 is defined to indicate clipping a value of z to a range [x, y].

$$Clip3(x, y, z) = \begin{cases} x; & z < x \\ y; & z > y \\ z; & \text{otherwise} \end{cases}$$

Figure 4:
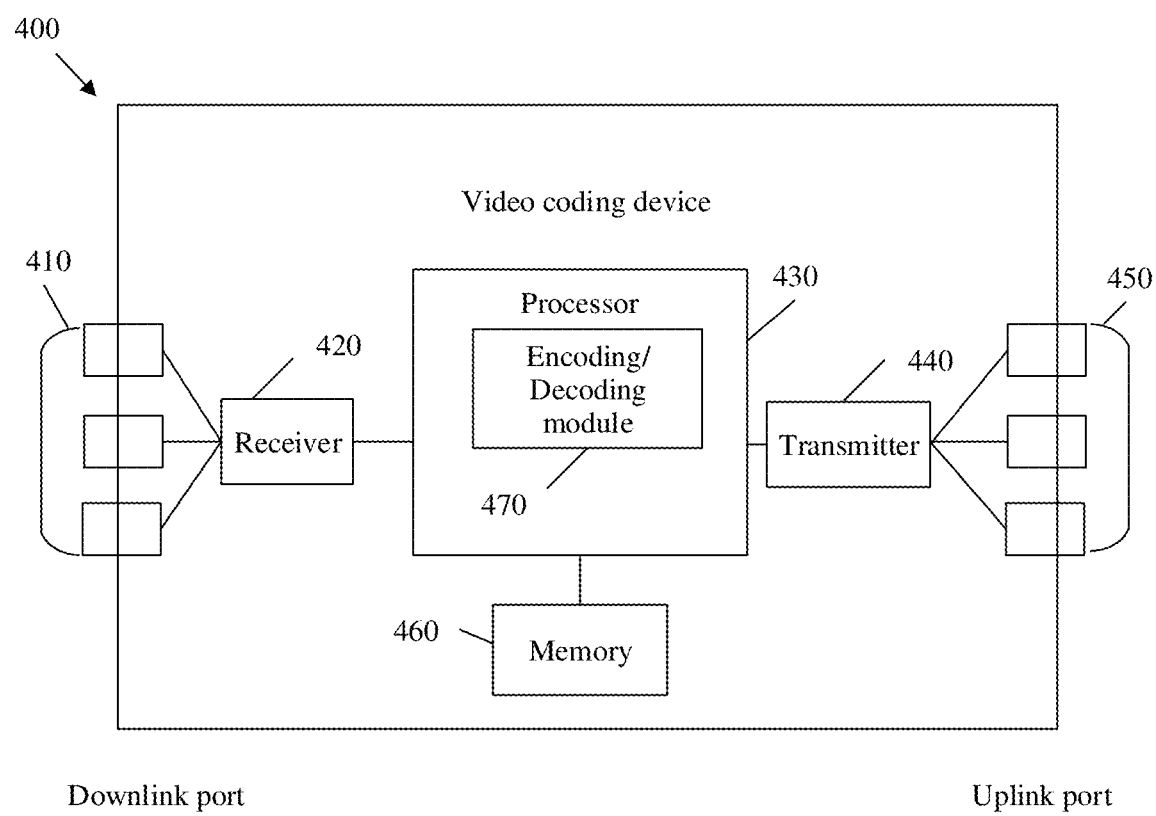
FIG. 4 is a block diagram of an example of a video coding device 400 for implementing an embodiment of the present disclosure.

FIG. 4 is a schematic structural diagram of a video coding device 400 (for example, a video encoding device 400 or a video decoding device 400) according to an embodiment of the present disclosure. The video coding device 400 is suitable for implementing an embodiment described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: ingress ports 410 and a receiver unit (Rx) 420 that are configured to receive data; a processor, a logic unit, or a central processing unit (CPU) 430 that is configured to process data; a transmitter unit (Tx) 440 and egress ports 450 that are configured to transmit data; and a memory 460 configured to store data. The video coding device 400 may further include an optical-to-electrical component and an electrical-to-optical (EO) component that are coupled to the ingress ports 410, the receiver unit 420, the transmitter unit 440, and the egress ports 450, for egress or ingress of optical or electrical signals.

The processor 430 is implemented by using hardware and software. The processor 430 may be implemented as one or more CPU chips, cores (for example, multi-core processors), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in this specification, to implement the method provided in the embodiments of the present disclosure. For example, the encoding/decoding module 470 implements, processes, or provides various coding operations. Therefore, inclusion of the encoding/decoding module 470 provides a substantial improvement to functions of the video coding device 400 and affects a transform of the video coding device 400 to a different state. Alternatively, the encoding/decoding module 470 is implemented as instructions stored in the memory 460 and executed by the processor 430.

The memory 460 includes one or more disks, tape drives, and solid state drives and may be used as an overflow data storage device, to store programs when such programs are selectively executed, and to store instructions and data that are read during program execution. The memory 460 may be volatile and/or non-volatile, and may be a read-only memory (ROM), a random access memory (RAM), a ternary content-addressable memory (ternary content-addressable memory, TCAM), and/or a static random access memory (SRAM).

Figure 5:
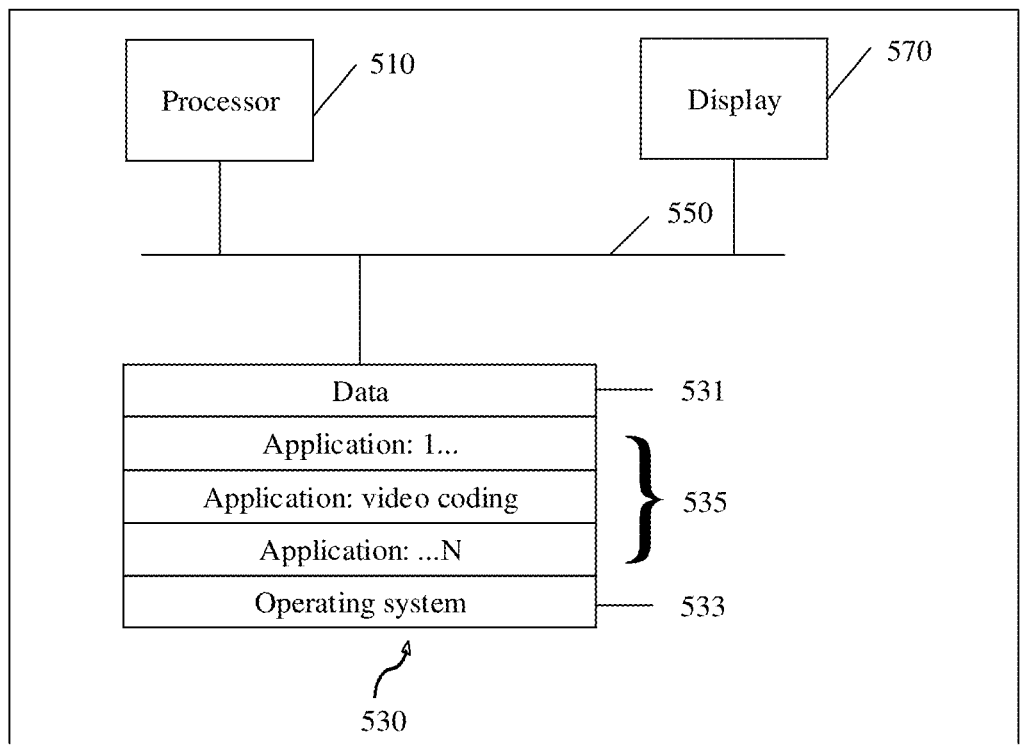
FIG. 5 is a block diagram of another example of an encoding apparatus or a decoding apparatus for implementing an embodiment of the present disclosure.

FIG. 5 is simplified block diagram of an apparatus 500 that can be used as either or both of the source device 12 and the destination device 14 in FIG. 1A according to an example embodiment. The apparatus 500 can implement the technologies of this application. In other words, FIG. 5 is a schematic block diagram of an implementation of an encoding device or a decoding device (coding device 500 for short) according to an embodiment of this application. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code. The processor can invoke the program code stored in the memory, to perform various video encoding or decoding methods described in this application, and in particular, various new video decoding methods. To avoid repetition, details are not described herein again.

In this embodiment of this application, the processor 510 may be a central processing unit (Central Processing Unit, "CPU" for short), or the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or may be any conventional processor or the like.

The memory 530 may include a read-only memory (ROM) device or a random access memory (RAM) device. Any other suitable type of storage device may alternatively be used as the memory 530. The memory 530 may include code and data 531 accessed by the processor 510 by using the bus 550. The memory 530 may further include an operating system 533 and an application program 535. The application program 535 includes at least one program that allows the processor 510 to perform the video encoding or decoding method (in particular, the decoding method described in this application) described in this application. For example, the application program 535 may include applications 1 to N, and further includes a video encoding or decoding application (video coding application for short) that performs the video encoding or decoding method described in this application.

The bus system 550 may not only include a data bus, but also include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch sensitive display that combines a display and a touch sensitive unit that is operable to sense a touch input. The display 570 may be connected to the processor 510 through the bus 550.

The following describes in detail the solutions in the embodiments of this application.

Key Terms and Definitions

CTU: coding tree unit (coding tree unit). A picture includes a plurality of CTUs, and one CTU generally corresponds to one square picture region, and includes luma samples and chroma samples in the picture region (or may include only luma samples, or may include only chroma samples). The CTU further includes syntax elements. These syntax elements indicate how to split the CTU into at least one coding unit (coding unit, CU), and a method for decoding each coding unit to obtain a reconstructed picture.

CU: coding unit. A CU generally corresponds to an A×B rectangular region, and includes A×B luma samples and chroma samples corresponding to the A×B luma samples. A represents the width of the rectangle, B represents the height of the rectangle, and A and B may be the same or different. Values of A and B are generally 2 raised to the power of an integer, for example, 256, 128, 64, 32, 16, 8, or 4. Decoding processing may be performed on a coding unit to obtain a reconstructed picture of the A×B rectangular region. The decoding processing generally includes processing such as prediction, dequantization, and inverse transform, to generate a predicted picture and a residual. The predicted picture and the residual are added up to obtain a reconstructed picture.

Figures 6A, 6B, 6C, 6D, 6E:
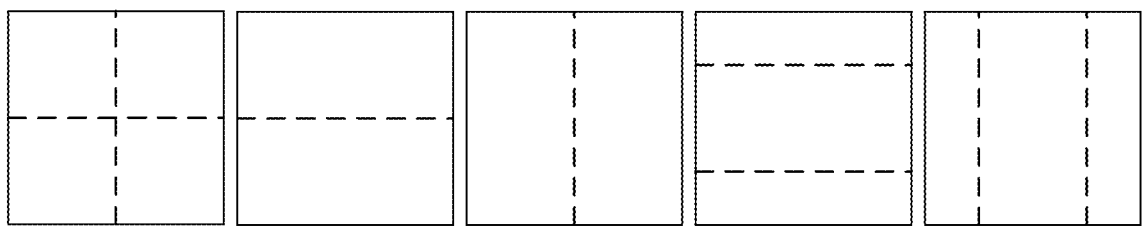
FIG. 6(*a*) to FIG. 6(*e*) are schematic block diagrams of block-based partition modes.

Quadtree is a tree structure. One node may be split into four child nodes. In the video coding standard H.265, a quadtree-based CTU partition mode in which the CTU is used as a root node, and each node corresponds to a square area is used. A node may not be split (in this case, an area corresponding to the node is a CU), or the node is split into four lower-level nodes, to be specific, the square area is split into four equal-sized square areas (the length and the width of each of the four equal-sized square areas are half of the length and the width of the square area before split), and each area corresponds to one node, as shown in FIG. 6(a).

Binary tree is a tree structure. One node may be split into two child nodes. In an existing binary tree-based coding method, a node in the binary tree structure may not be split, or the node is split into two lower-level nodes. The splitting into two child nodes may be performed in either of the following two manners: (1) horizontal binary split: splitting a region corresponding to the node into two regions of a same size: an upper region and a lower region, where each region corresponds to one node, as shown in FIG. 6(b); and (2) vertical binary split: splitting a region corresponding to the node into two regions of a same size: a left region and a right region, where each region corresponds to one node, as shown in FIG. 6(c).

Triple tree is a tree structure. One node may be split into three child nodes. In an existing ternary tree-based coding method, a node in the ternary tree structure may not be split, or the node is split into three lower-level nodes. The splitting into two three nodes may be performed in either of the following two manners: (1) horizontal ternary tree split: splitting a region corresponding to a node into three regions: an upper region, a middle region, and a lower region, where each region corresponds to one node, and the heights of the three regions are ¼, ½, and ¼ of the heights of the node, as shown in FIG. 6(d); and (2) vertical ternary tree split: splitting a region corresponding to a node into three regions: a left region, a middle region, and a right region, where each region corresponds to one node, and the widths of the three regions are ¼, ½, and ¼ of the heights of the node, as shown in FIG. 6(e).

Video decoding (video decoding) is a processing process of restoring a video bitstream to a reconstructed picture according to a specific syntax rule and a processing method.

Video encoding (video encoding) is a processing process of compressing a picture sequence into a bitstream.

Video coding (video coding) is an umbrella term for video encoding and video decoding. Video coding and video encoding have a same Chinese translation.

VTM is a new codec reference software developed by the JVET.

AVS2: second generation audio video coding standard (AVS)

According to the video coding standard, a frame of picture is partitioned into non-overlapping coding tree units (CTU). A size of a CTU may be set to 64×64 (the size of the CTU may alternatively be set to another value, for example, the size of the CTU in JVET reference software JEM is increased to 128×128 or 256×256). A 64×64 CTU is a rectangular pixel matrix with 64 rows of which each row includes 64 pixels, and each pixel includes a luma component or/and a chroma component.

A quadtree (quad-tree, QT for short)-based CTU split method is used in video coding. A CTU serves as a root (root) node of a quadtree, and the CTU is recursively split into several leaf nodes (leaf node) in the quadtree split mode. One node corresponds to one picture area. If a node is not split, the node is referred to as a leaf node, and a picture area corresponding to the node becomes a CU. If a node is further split, a picture area corresponding to the node is split into four areas of a same size (the length and the width of the four areas are half the length and the width of the split area respectively), and each area corresponds to one node. Whether these nodes are further split needs to be separately determined. Whether a node is further split is indicated by a split flag split_cu_flag that is in a bitstream and that corresponds to the node. A quadtree depth (qtDepth) of a root node is 0, and a quadtree depth of a child node is a quadtree depth of a parent node plus 1. For brevity of description, in the following, a size and a shape of a node are a size and a shape of a picture region corresponding to the node.

For a 64×64 CTU node (a quadtree depth is 0), the 64×64 CTU node may not be split based on split_cu_flag corresponding to the 64×64 CTU node, and the CTU node forms one 64×64 CU; or the 64×64 CTU node is split into four 32×32 nodes (the quadtree depth is 1). Each of the four 32×32 nodes may be further split or not split based on split_cu_flag corresponding to each of the four nodes. If one 32×32 node is further split, four 16×16 nodes are generated (the quadtree depth is 2). By analogy, splitting ends until all the nodes are not further split, and such a CTU is split into a group of CUs. A minimum size (size) of a CU is identified in an SPS, for example, 8×8 represents the minimum size of the CU. In the foregoing recursive split process, if a size of a node is equal to the minimum CU size (minimum CU size), the node is not further split by default, and a split flag of the node does not need to be included in a bitstream.

After a node is parsed to be a leaf node, the leaf node is a CU, coding information (including information such as a prediction mode and a transform coefficient of the CU, for example, a coding_unit( ) syntax structure in H.265) corresponding to the CU is further parsed. Then, decoding processing such as prediction, dequantization, inverse transform, and loop filtering is performed on the CU based on the coding information, to generate a reconstructed picture corresponding to the CU. The CTU may be split into a group of CUs with appropriate sizes based on a local picture feature by using the quadtree structure. For example, a smooth region is split into larger CUs, and a richly textured region is split into smaller CUs.

A mode of splitting a CTU into a group of CUs corresponds to a coding tree (coding tree). That a specific coding tree should be used for a CTU is usually determined based on a rate distortion optimization (rate distortion optimization, RDO) technology of an encoder. An encoder attempts to use a plurality of CTU partition modes, and each partition mode corresponds to one rate distortion cost (RD cost). The encoder compares RD costs of various partition modes that have been attempted to use, finds a partition mode with a smallest RD cost, and uses the partition mode as an optimal partition mode of the CTU for actual coding of the CTU. The CTU partition modes that the encoder has attempted to use need to comply with a split rule specified by a decoder, so that the decoder can correctly identify the CTU partition modes.

The video coding standard is a block-based coding scheme. First, a frame of a picture needs to be partitioned into non-overlapping coding tree units (CTUs). A size of a CTU may be set to 64×64 (the size of the CTU may alternatively be set to another value; for example, the size of the CTU in JVET reference software JEM is increased to 128×128 or 256×256). The CTU may be further split into several coding units CUs based on a quadtree (quad-tree, QT) structure, and each CU includes one luma coding block (CB), two chroma coding blocks (CB), and corresponding syntax elements (including information such as a prediction mode and a transform coefficient of the CU, for example, the coding_unit( ) syntax structure in H.265). The coding unit CU may be further split into one or more prediction units (Prediction Unit, PU) and one or more transform units (Transform Unit, TU).

A prediction unit is a basic unit for performing prediction operations, including intra prediction and inter prediction. A CU determines all PU prediction modes and partition modes included in the unit.

A transform unit is a basic unit for performing transform and quantization, and is obtained by splitting the CU. Splitting from a CU to TUs is performed by using a quadtree (quad-tree, QT), which is referred to as a "transform tree", or by using a residual quad tree (Residual Quad Tree, RQT). In the JVET, a triple tree (Triple Tree, TT) or binary tree (binary tree, BT) split mode may alternatively be used.

Figure 7:
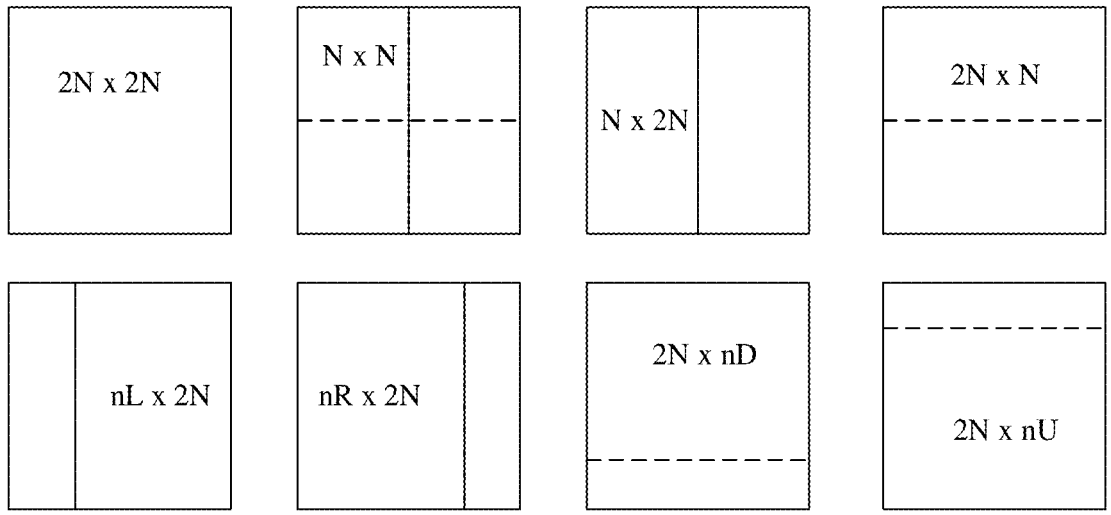
FIG. 7 is a schematic block diagram of block-based partition modes.

In the video coding standard, one CU may be split into a plurality of PUs, splitting from the CU to the PU is performed at only one level, and a smallest PU is 4×4. As shown in FIG. 7, one 2N×2N CU may be split into PUs in eight modes. For inter prediction, there are eight optional modes shown in FIG. 7. For intra prediction, only a 2N×2N or N×N mode can be used.

Figures 8A, 8B, 8C, 8D:
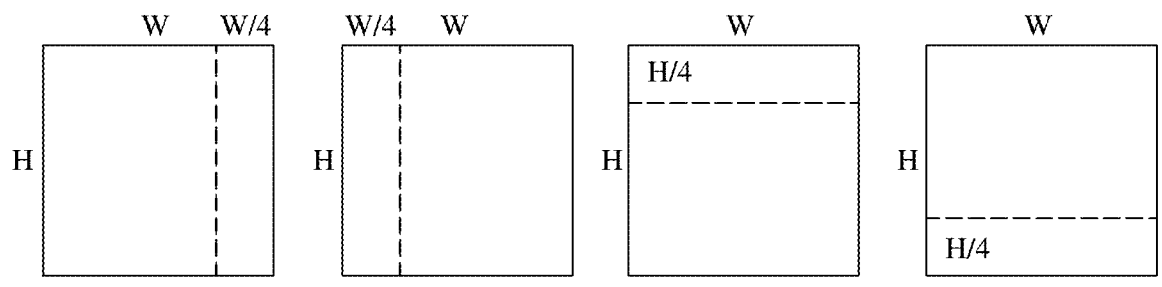
FIG. 8(*a*) to FIG. 8(*f*) are schematic block diagrams of block-based partition modes.
Figures 8E, 8F:
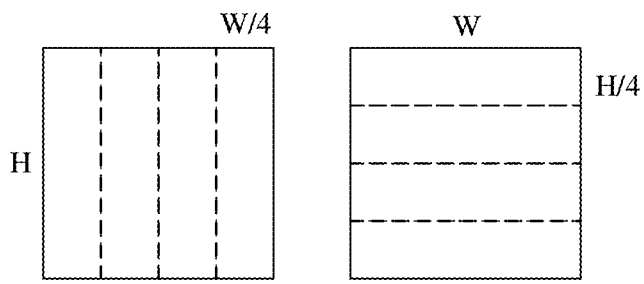

Based on the foregoing solution to splitting the CU into the PUs, AVS2 provides the following split methods: quartering partition (including horizontal quartering partition and vertical quartering partition) and asymmetric partition (asymmetric partition, AMP). The asymmetric partition includes horizontal asymmetric binary split and vertical asymmetric binary split, as shown in FIG. 8(a) to FIG. 8(f). The horizontal quartering partition and the vertical quartering partition are shown in FIG. 8(e) and FIG. 8(f). A size of the current coding block is W×H, that is, W pixels are included in a horizontal direction, and H pixels are included in a vertical direction.

A manner of splitting a CU into a plurality of TUs is quadtree (quad-tree, QT) split, or may be binary split, ternary split, horizontal quartering partition, or vertical quartering partition.

Figure 9:
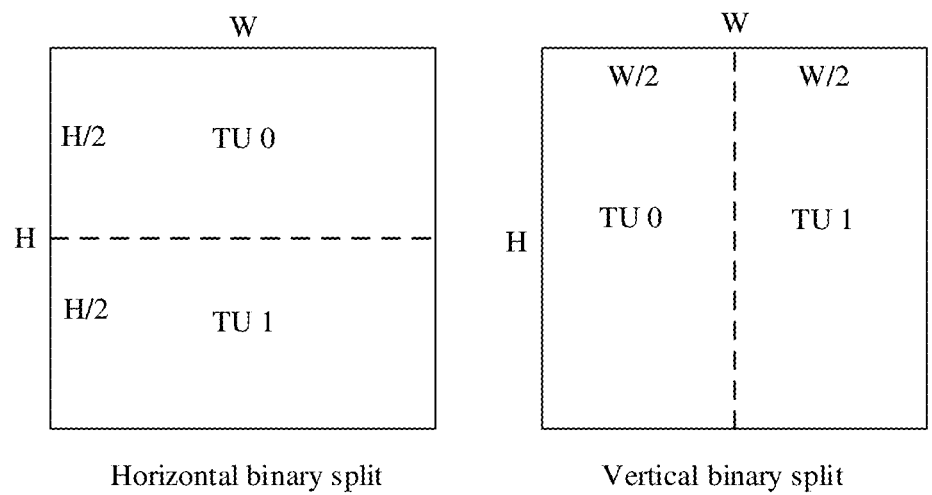
FIG. 9 is a schematic block diagram of block-based partition modes.

Binary split includes horizontal binary split and vertical binary split. A CU is split into two TUs, as shown in FIG. 9.

Figure 10:
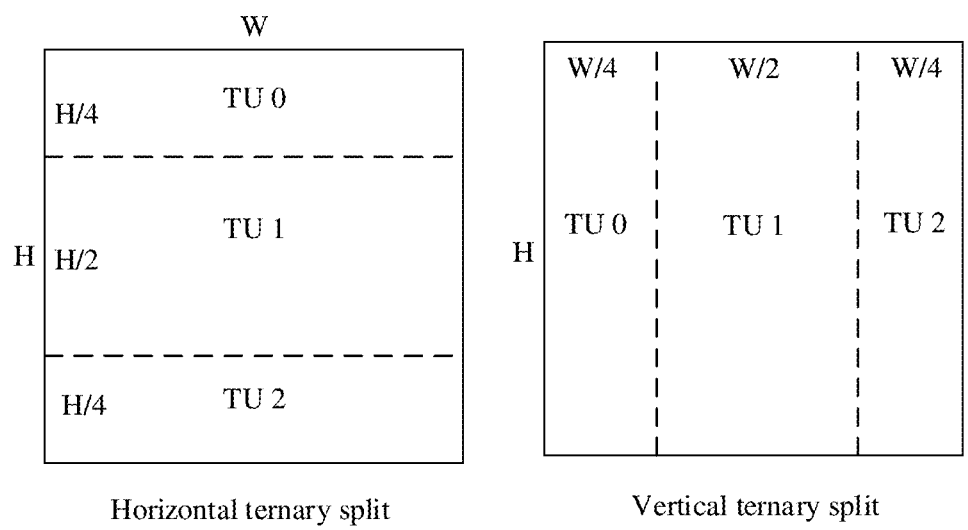
FIG. 10 is a schematic block diagram of block-based partition modes.
Figure 11:
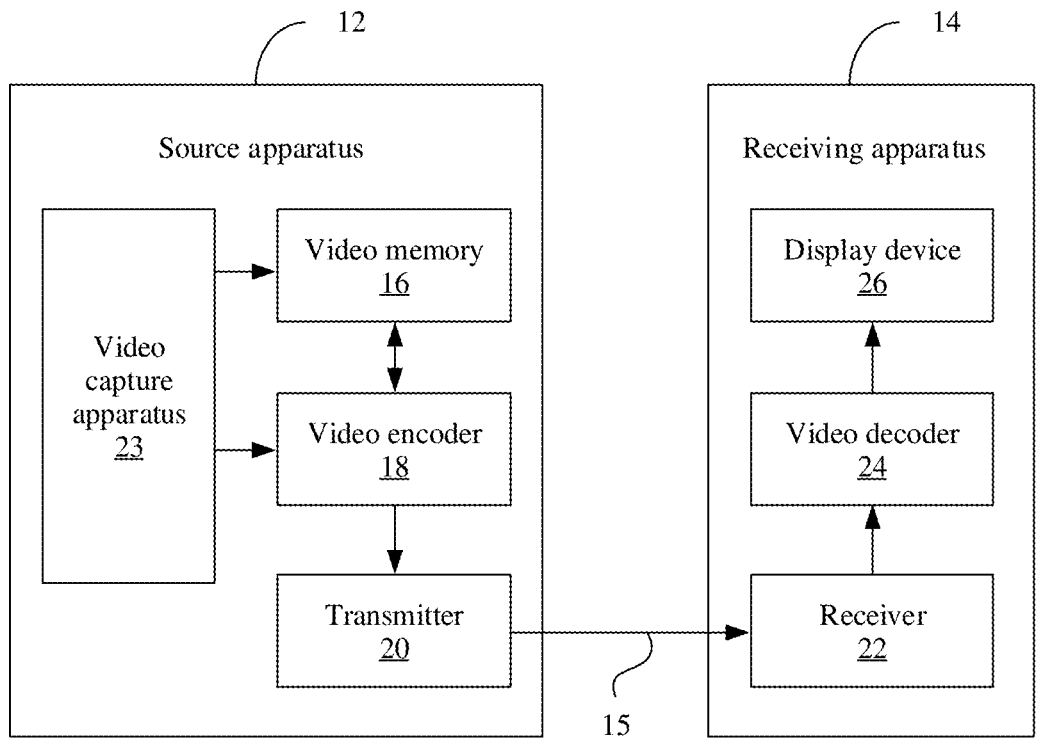
FIG. 11 is a schematic block diagram of a video communication system for implementing an embodiment of the present disclosure.

Ternary split includes horizontal ternary split and vertical ternary split, and a CU is split into three TUs. In horizontal ternary split, the current CU is horizontally split into two TUs having a size of W×(H/4) and one TU having a size of W×(H/2), as shown in FIG. 10.

In this technology, partition complexity is relatively high and small chroma blocks (especially chroma blocks having sizes of 2×2, 2×4, and 2×8) are generated. For a hardware decoder, costs for processing small blocks are relatively high. However, a partition mode generates small blocks having sizes of 2×2, 2×4, or the like. This is unfavorable for implementation of the hardware decoder.

The present disclosure provides a method for splitting a CU into PBs (prediction block, prediction block). A PB partition mode is determined based on a size of a to-be-split CU, and does not need to be obtained from a bitstream, thereby reducing coding complexity.

The present disclosure further provides a method for splitting a CU into TBs (transform block, transform block). When a side length of a luma TB obtained after CU splitting is 4, a size of a corresponding chroma TB is the same as a size of a chroma block of the CU. In this manner, a chroma block whose side length is 2 may be avoided, and a maximum throughput of the decoder is reduced, facilitating implementation of the decoder.

The present disclosure provides a method for splitting a CU into PBs (prediction block, prediction block). A PB partition mode that is allowed to be used is determined based on a size of a to-be-split CU, thereby reducing coding complexity.

The present disclosure further provides a method for splitting a CU into TBs (transform block, transform block). A TB partition mode can be determined based on a PB partition mode. In this manner, coding complexity can be reduced, and coding performance can be improved.

The present disclosure is applicable to a video encoder and a video decoder. A video communication system is shown in FIG. 5, in which 18 represents a video encoder, and 24 represents a video decoder. The present disclosure is applicable to modules 18 and 24.

The present disclosure relates to a processing manner in which a coding unit (coding unit, CU) in video decoding is split into a prediction block PB and a transform block TB for decoding. A video data format in the embodiments is a YUV4:2:0 format. A similar manner may be used for YUV4:2:2 data.

Step 1: Parse a bitstream to obtain a prediction mode of a current coding unit.

A corresponding syntax element in the bitstream is parsed to determine whether the prediction mode of the current coding unit is inter prediction or intra prediction.

Step 2: Determine whether a current coding block (or referred to as a current coding unit) needs to be split into at least two luma PBs.

A partition mode of the current coding block may be at least one of quartering partition (including horizontal quartering partition and vertical quartering partition) and asymmetric partition AMP, or may be another partition mode. This is not limited in the present disclosure.

In some implementations, whether the current coding block needs to be split into at least two luma PBs may be identified by using a syntax element. Therefore, determining whether the current coding block needs to be split into at least two luma PBs can be implemented by parsing a bitstream.

In some implementations, whether the current coding block needs to be split into at least two luma PBs may alternatively be derived based on a width and a height of the current coding unit. The derivation method needs to meet at least one of the following conditions:

Condition 1: A ratio of a width to a height W/H of the current coding block is between 1/N and N (including 1/N or N), where N is, for example, 2.

Condition 2: A maximum side length of the current coding block is maxSize (or referred to as a first threshold). For example, maxSize is 64 or 32.

Condition 3: A ratio of a width to a height of a PB obtained through splitting is between 1/M and M (including 1/M or M), where M is, for example, 8.

Condition 4: Both a width and a height of a PB obtained through splitting are greater than or equal to a threshold minSize (or referred to as a second threshold), where minSize is an integer greater than 1. For example, minSize is 4.

Condition 5: A minimum side length of the current coding block is S (or referred to as a third threshold), and both a width and a height of a PB obtained through splitting are greater than or equal to K (or referred to as a fourth threshold). For example, S is 16, and K is 4.

If the current coding block needs to be split into at least two luma PBs, step 3 to step 6 are performed.

Step 3: Determine a luma PB partition mode of the current coding block.

Information about the luma PB partition mode of the current coding block is usually transmitted in a bitstream, and the luma PB partition mode of the current coding block can be obtained by parsing a corresponding syntax element in the bitstream. During the parsing of the luma PB partition mode of the current coding block, the luma PB partition mode that is allowed to be used for the current coding block is determined based on a width and a height of the current coding block or/and a width and a height of the luma PB obtained through splitting. The determining method may include one of the following methods:

Method 1: When both the width and the height of the current coding block are less than or equal to X, quartering partition and AMP partition may be used, where X is an integer greater than 16. For example, X is 32 or 64.

Method 2: When both the width and the height of the current coding block are equal to Y, only quartering partition is used, and AMP partition cannot be used, where Y is an integer greater than 16. For example, Y is 64.

Method 3: When a side length of a to-be-split side of the current coding block is equal to A, and a side length of a non-split side is equal to B, the to-be-split side can be split only through quartering partition, and AMP partition cannot be used, where A and B are integers greater than 4. For example, A is 64 and B is 32. For another example, A is 32 and B is 32. The to-be-split side is the width of the current coding block. In this case, a partition mode of the to-be-split side is vertical quartering partition, vertical asymmetric partition 1:3, or vertical asymmetric partition 3:1. If the to-be-split side is the height of the current coding block, the partition mode of the to-be-split side is horizontal quartering partition, horizontal asymmetric partition 1:3, or horizontal asymmetric partition 3:1.

Method 4: When a side length of a to-be-split side of the current coding block is equal to C, and a side length of a non-split side is equal to D, the to-be-split side is split without using quartering partition and AMP. C and D are integers greater than 4. For example, C is 32 and D is 64. For another example, C is 32 and D is 32.

Method 5: When a side length of a to-be-split side of the current coding block is less than a threshold T, the to-be-split side may be split through AMP partition, and quartering partition cannot be used, where T is an integer greater than or equal to 16; for example, T=16 or T=32.

The to-be-split side of the coding block is a side perpendicular to a partition direction: when the partition mode is vertical quartering partition or vertical asymmetric binary split, the to-be-split side is the width of the coding block; when the partition mode is horizontal quartering partition or horizontal asymmetric binary split, the to-be-split side is the height of the coding block. The non-to-be-split side of the coding block is a side parallel to a partition direction: when the partition mode is vertical quartering partition or vertical asymmetric binary split, the non-split side is the height of the coding block; when the partition mode is horizontal quartering partition or horizontal asymmetric binary split, the to-be-split side is the width of the coding block.

Step 4: Split the current coding block in a corresponding partition mode, to obtain a luma PB and a chroma PB.

If the current coding block uses intra prediction, the luma block of the current coding block is split in the luma PB partition mode of the current coding block, to obtain each luma PB; and the chroma block of the current coding block is not split, and corresponds to one chroma PB.

If inter prediction is used for the current coding block, one of the following modes may be used:

Mode 1: The chroma block and the luma block of the current coding block are split in the luma PB partition mode of the current coding block, to obtain each luma PB and each chroma PB.

Mode 2: When the luma block is split into at least two luma PBs, and a side length of at least one side of the luma PB obtained through splitting is 4, the chroma block is not split, and becomes one chroma PB. Otherwise, the chroma block and the luma block of the current coding block are split in the luma PB partition mode of the current coding block, to obtain each luma PB and each chroma PB. When the chroma block is not split, motion information of the chroma component is motion information of the luma PB at a central location of the current coding block.

The central location means that if the size of the current coding block is W×H, coordinates of the central location of the current coding block relative to the upper left vertex of the current coding block are (W/2, H/2).

Step 5: Determine a luma TB partition mode and a chroma TB partition mode of the current coding block, to obtain a size of each TB.

When the current coding block uses intra prediction, a TB can be obtained by using one of the following methods:

(a) If the luma PB partition mode is vertical quartering partition or vertical asymmetric binary split, the luma block of the current coding block is split into four luma TBs in a vertical quartering partition mode.

(b) If the luma PB partition mode is horizontal quartering partition or horizontal asymmetric binary split, the luma block of the current coding block is split into four luma TBs in the horizontal quartering partition mode.

(c) The chroma block is not split, and becomes one chroma TB.

When inter prediction is used for the current coding block, a TB can be obtained by using one of the following methods:

(a) If the luma PB partition mode is vertical quartering partition or vertical asymmetric binary split, the luma block of the current coding block may be split into four luma TBs in a vertical quartering partition mode, or directly becomes one luma TB without splitting.

(b) If the luma PB partition mode is horizontal quartering partition or horizontal asymmetric binary split, the luma block of the current coding block may be split into four TBs in a horizontal quartering partition mode, or is not split and becomes one TB. Whether the luma block is split into four TBs or becomes one TB can be determined by parsing a syntax element in a bitstream.

(c) Splitting the chroma block into TBs can be performed in one of the following modes:

Mode 1: A mode of splitting the chroma block into TBs is the same as a mode of splitting the luma block into TBs.

Mode 2: The chroma block is not split, and becomes one chroma TB.

Mode 3: When the luma block is split into four luma TBs in a quartering partition mode, and a side length of one side of the luma TB is E (which may be, for example, 4), the chroma block is not split and becomes one chroma TB.

Step 6: Obtain prediction information of each luma PB, and obtain residual information of each luma TB.

The prediction information of the luma PB and the residual information of the luma TB may be obtained by parsing corresponding syntax elements in the bitstream, or may be obtained through derivation.

The prediction information of the luma PB includes: a prediction mode (indicating an intra prediction mode or an inter prediction mode), an intra prediction mode, motion information, and the like. The intra prediction mode of the luma block may be one of a planar mode (Planar Mode), a direct current mode (DC Mode), and an angular mode (angular Mode). The motion information may include information such as a prediction direction (forward, backward, or bidirectional), a reference frame index (reference index), or a motion vector (motion vector).

The residual information of the luma TB includes a coded block flag (coded block flag, cbf), a transform coefficient, a transform type (for example, DCT-2, DST-7, or DCT-8), and the like.

Step 7: Obtain prediction information of each chroma PB, and obtain residual information of the chroma TB.

The prediction information of the chroma PB and the residual information of the chroma TB may be obtained by parsing corresponding syntax elements in the bitstream, or may be obtained through derivation.

The intra prediction mode of the chroma PB may be one of a direct current mode, a planar mode, an angular mode, and a linear model (linear model) mode.

The transform type of the chroma TB may be DCT-2 transform by default.

After the prediction information of each luma PB and the residual information of each luma TB are obtained, inter prediction processing or intra prediction processing may be performed on each luma PB based on a prediction mode corresponding to each luma PB, to obtain an inter prediction picture or an intra prediction picture of each luma PB. Then, based on the residual information of each luma TB, the transform coefficient is inversely quantized and inversely transformed to obtain a residual picture of each luma TB. The predicted picture of each luma PB and the residual picture of each luma TB are added to generate a reconstructed picture of the luma block.

After the prediction information of each chroma PB and the residual information of each chroma TB are obtained, inter prediction processing or intra prediction processing may be performed on each chroma PB based on a prediction mode of each chroma PB, to obtain an inter prediction picture or an intra prediction picture of each chroma PB. Then, based on the residual information of each chroma TB, the transform coefficient is inversely quantized and inversely transformed to obtain a residual picture. The predicted picture of each chroma PB and the residual picture of each chroma TB are added to generate a reconstructed picture of the chroma block.

A plurality of types of PB and TB split are used to improve coding efficiency. A PB and TB split mode available for the current CU is determined based on a width and a height of the current CU, so as to prevent a size of a PB from exceeding a size (for example, 32×32) of a hardware pipeline unit. In addition, for a coding unit for which inter prediction is used, when the luma block is split into four TBs and a side length of the TB is 4, the chroma TB is not split, so as to avoid generating a chroma TB whose side length is 2.

The technical solutions of the present disclosure bring the beneficial effect of reducing coding complexity.

A chroma block whose side length is 2 may be avoided, and a maximum throughput of the decoder is reduced, facilitating implementation of the hardware decoder.

Figure 12:
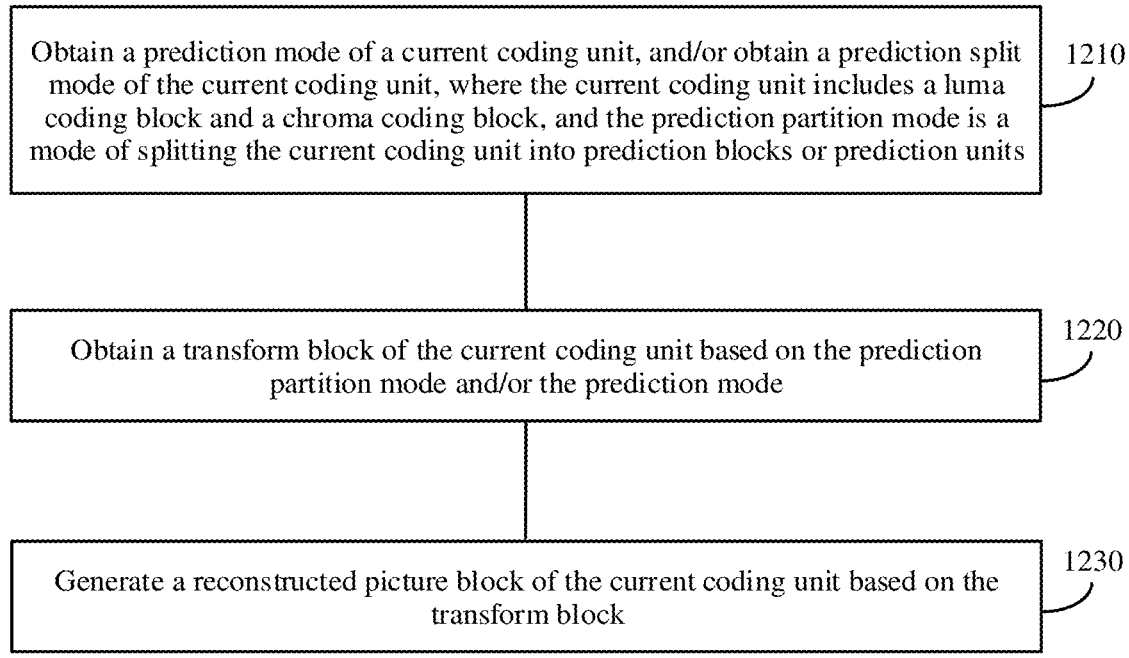
FIG. 12 is a schematic flowchart of a picture reconstruction method according to an embodiment of this application.
Figure 13A:
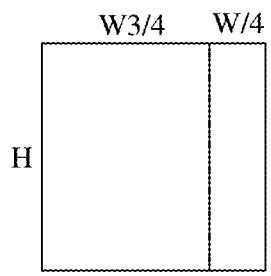
FIG. 13(*a*) to FIG. 13(*f*) are schematic diagrams of quartering partition and asymmetric partition according to an embodiment of this application.
Figure 13B:
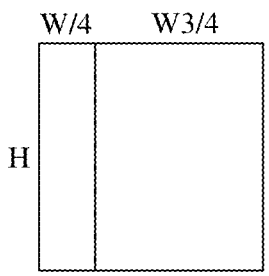
Figure 13C:
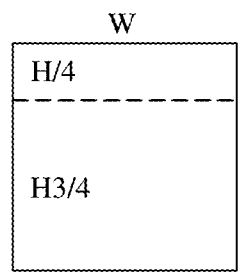
Figure 13D:
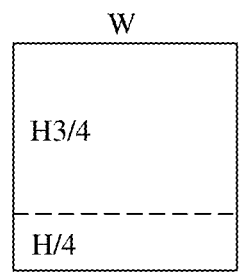
Figure 13E:
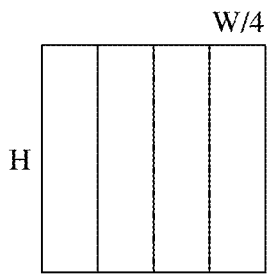
Figure 13F:
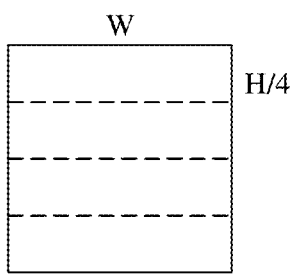

FIG. 12 is a schematic flowchart of a method 1200 for processing a coding block according to an embodiment of this application.

It should be understood that the method 1200 for processing a coding block shown in FIG. 12 may be performed by the foregoing encoder 20 shown in FIG. 2, or may be performed by the foregoing decoder 30 shown in FIG. 3. The method 1200 shown in FIG. 12 includes steps 1210, 1220, and 1230, which are described in detail below.

S1210: Obtain a prediction mode of a current coding unit, and/or obtain a prediction partition mode of the current coding unit, where the current coding unit includes a luma coding block and a chroma coding block, and the prediction partition mode is a mode of splitting the current coding unit into prediction blocks or prediction units.

The prediction mode may include an intra prediction mode and an inter prediction mode, and the prediction partition mode may include quartering partition and asymmetric partition (asymmetric partition, AMP).

As shown in FIG. 13(*a*) to FIG. 13(*f*), the asymmetric partition may include vertical asymmetric partition 3:1, vertical asymmetric partition 1:3, horizontal asymmetric partition 1:3, and horizontal asymmetric partition 3:1. The quartering partition may include vertical quartering partition and horizontal quartering partition. A size of the current coding block is W×H, that is, W pixels are included in a horizontal direction, and H pixels are included in a vertical direction.

It should be understood that FIG. 13(*a*) to FIG. 13(*f*) are merely an example rather than a limitation. The prediction partition mode of the current coding block in this application may also include another partition mode. This is not limited in this embodiment of this application.

Optionally, when the method 1200 is performed by an encoder, the obtaining a prediction mode of a current coding unit (coding unit, CU) may include: obtaining the prediction mode.

When the method 1200 is performed by a decoder, the obtaining a prediction mode of a current coding unit may include: obtaining the prediction mode from a bitstream through parsing or derivation, where the prediction mode includes an intra prediction mode and an inter prediction mode.

Similarly, when the method 1200 is performed by an encoder, the obtaining a prediction partition mode of the current coding unit may include: obtaining the prediction partition mode.

When the method 1200 is performed by a decoder, the obtaining a prediction mode of a current coding unit may include: determining, based on a size of the current coding unit, candidate prediction partition modes that are allowed to be used for the current coding unit; and determining the prediction partition mode from the candidate prediction partition modes that are allowed to be used.

The determining the prediction partition mode from the candidate prediction partition modes that are allowed to be used may be: parsing a bitstream to obtain an identifier indicating the prediction partition mode, and determining, based on the identifier of the prediction partition mode, the prediction partition mode from the candidate prediction partition modes that are allowed to be used. In this embodiment of this application, the bitstream (video data) format may be a YUV4:2:0 format or a YUV4:2:2 format, or may be another format. This is not limited in this application.

Alternatively, the obtaining a prediction partition mode of the current coding unit may include: determining the prediction partition mode of the current coding unit based on a size of the current coding unit.

In this embodiment of this application, the prediction partition mode can be determined based on the size of the current coding unit (a bitstream does not need to be parsed or only a small amount of information in a bitstream needs to be parsed). Therefore, video coding complexity can be reduced, and coding efficiency can be improved.

Alternatively, the obtaining a prediction partition mode of the current coding unit may further include: determining the prediction partition mode of the current coding unit based on the prediction mode.

In this embodiment of this application, the prediction partition mode can be determined based on the prediction mode (a bitstream does not need to be parsed or only a small amount of information in a bitstream needs to be parsed). Therefore, video coding complexity can be reduced, and coding efficiency can be improved.

The determining the prediction partition mode of the current coding unit based on a size of the current coding unit can be implemented in one of the following modes:

Mode 1:

When the width of the current coding unit is less than or equal to M, and the height of the current coding unit is less than or equal to M, the prediction partition mode of the current coding unit is quartering partition or asymmetric partition, where M may be an integer greater than 16. For example, M is 32 or 64.

Mode 2:

When the width of the current coding unit is equal to N, and the height of the current coding unit is equal to N, the prediction partition mode of the current coding unit is quartering partition, where N may be an integer greater than 16. For example, N is 64.

Mode 3:

When the side length of the to-be-split side of the current coding unit is an integer greater than 4, and the side length of the non-to-be-split side of the current coding unit is an integer greater than 4, the prediction partition mode of the current coding unit is quartering partition.

For example, the side length of the to-be-split side is 64, and the side length of the non-to-be-split side is 32. Alternatively, the side length of the to-be-split side is 32, and the side length of the non-to-be-split side is 32.

The to-be-split side is a side perpendicular to the partition direction of the current coding unit, and the non-to-be-split side is a side parallel to the partition direction of the current coding unit.

For example, as shown in FIG. 13(*a*) to 3(*f*), to-be-split sides in FIG. 13(*a*), FIG. 13(*b*), and FIG. 13(*e*) are widths of coding units, and non-to-be-split sides are heights of coding units. To-be-split sides in FIG. 13(*c*), FIG. 13(*d*), and FIG. 13(*f*) are heights of coding units, and non-to-be-split sides are widths of coding units.

Mode 4:

When the side length of the to-be-split side of the current coding unit is an integer greater than 4, and the side length of the non-to-be-split side of the current coding unit is an integer greater than 4, the prediction partition mode of the current coding unit is not quartering partition or asymmetric partition. It should be noted that if the prediction partition mode of the current coding unit includes quartering partition or asymmetric partition, the current coding unit is not split in this case.

For example, the side length of the to-be-split side is 32, and the side length of the non-to-be-split side is 64. Alternatively, the side length of the to-be-split side is 32, and the side length of the non-to-be-split side is 32.

Mode 5:

When the side length of the to-be-split side of the current coding unit is less than a preset first threshold, the prediction partition mode of the current coding unit is asymmetric partition, the preset first threshold is an integer greater than or equal to 16, and the first threshold may be an integer greater than or equal to 16. For example, the first threshold is 16, or the first threshold is 32.

The to-be-split side of the current coding unit is a side perpendicular to a partition direction.

For example, when the prediction partition mode is vertical quartering partition or vertical asymmetric binary split, the to-be-split side is the width of the current coding unit. When the prediction partition mode is horizontal quartering partition or horizontal asymmetric binary split, the to-be-split side is the height of the current coding unit.

The non-to-be-split side of the current coding unit is a side parallel to the partition direction.

For example, when the prediction partition mode is vertical quartering partition or vertical asymmetric binary split, the non-split side is the height of the current coding unit. When the prediction partition mode is horizontal quartering partition or horizontal asymmetric binary split, the to-be-split side is the width of the current coding unit.

It should be understood that the foregoing several manners are merely examples rather than limitations. In this application, the prediction partition mode of the current coding unit may alternatively be determined in another manner. This is not limited in this embodiment of this application.

In this embodiment of this application, before S1210, the method 1200 may further include S1201.

S1201: Determine whether to allow splitting of the current coding unit to obtain a prediction block.

Alternatively, the determining whether to allow splitting of the current coding unit to obtain a prediction block (prediction block, PB) may be understood as: determining whether the current coding unit needs to be split to obtain a prediction block.

Optionally, it can be determined, based on the size of the current coding unit, whether to allow splitting of the current coding unit to obtain a prediction block.

For example, it can be determined that splitting of the current coding unit to obtain a prediction block is allowed when the size of the current coding unit meets at least one of the following conditions:

1. A ratio of a width to a height of the current coding unit is less than P.
2. A maximum side length of the current coding unit is equal to a preset first threshold.
3. A ratio of a width to a height of a prediction block obtained by pre-splitting the current coding unit is between 1/Q and Q.
4. Both a width and a height of a prediction block obtained by pre-splitting the current coding unit are greater than or equal to a preset second threshold.
5. A minimum side length of the current coding block is equal to a preset third threshold, and both a width and a height of a prediction block obtained by pre-splitting the current coding unit are greater than or equal to a preset fourth threshold.

Q and P are positive integers, and the second threshold may be an integer greater than 1.

For example, Q may be 8, the first threshold may be 64 or 32, the second threshold may be 4, the third threshold may be 16, and the fourth threshold may be 4.

It should be noted that the foregoing pre-splitting means pre-estimating a prediction block that may be obtained after the current coding unit is split, instead of actually splitting the current coding unit.

Optionally, when the size of the current coding unit does not meet any one of the foregoing conditions, it may be determined that splitting of the current coding unit to obtain a prediction block is not allowed.

In this embodiment of this application, it can be determined, based on the size of the current coding unit, whether to allow splitting of the current coding unit to obtain a prediction block. Therefore, video coding complexity can be reduced, and coding efficiency can be improved.

Further, the step of obtaining the prediction partition mode of the current coding unit can be performed when it is determined that splitting of the current coding unit to obtain a prediction block is allowed.

Alternatively, a syntax element may be obtained by parsing the bitstream, and it is determined, by using the syntax element, whether to allow splitting of the current coding unit to obtain a prediction block.

Further, when it is determined that splitting of the current coding unit is allowed, the prediction block of the current coding unit can be obtained based on the prediction partition mode and/or the prediction mode.

For example, when the prediction mode is the intra prediction mode, the luma coding block can be split in the prediction partition mode to obtain a luma prediction block; and the chroma coding block is not split, and the chroma coding block is used as a chroma prediction block.

For another example, when the prediction mode is the inter prediction mode, the current coding unit may not be split, and the current coding unit is used as a prediction unit.

In this embodiment of this application, when the prediction mode is the inter prediction mode, the current coding unit is not split, so that a coding block having an excessively small size can be avoided, and coding efficiency can be improved.

For another example, when the prediction mode is the inter prediction mode, the current coding unit may be split in any one of the following modes:

Mode 1:

Split the luma coding block in the prediction partition mode to obtain a luma prediction block, and split the chroma coding block in the prediction partition mode to obtain a chroma prediction block.

Mode 2:

Split the luma coding block in the prediction partition mode to obtain a luma prediction block, and when there are two luma prediction blocks and a length of at least one side of at least one of the two luma prediction blocks is 4, skip splitting the chroma coding block and use the chroma coding block as a chroma prediction block; otherwise, split the luma coding block in the prediction partition mode to obtain a luma prediction block, and split the chroma coding block in the prediction partition mode to obtain a chroma prediction block.

When the chroma coding block is not split, motion information of the chroma component may be motion information of the luma coding block at a central location of the current coding unit.

The central location may mean that if the size of the current coding unit is W×H, coordinates of the central location relative to the upper left vertex of the current coding unit are (W/2, H/2).

In this embodiment of this application, the transform block of the current coding unit is obtained directly based on the prediction partition mode and/or the prediction mode (a bitstream does not need to be parsed or only a small amount of information in a bitstream needs to be parsed). Therefore, video coding complexity can be reduced, and coding efficiency can be improved.

S1220: Obtain a transform block of the current coding unit based on the prediction partition mode and/or the prediction mode.

Optionally, the transform block (transform block, TB) of the current coding unit can be obtained based on the prediction partition mode and the prediction mode; or the transform block of the current coding unit can be obtained based on the prediction partition mode; or the transform block of the current coding unit can be obtained based on the prediction mode.

In this embodiment of this application, the current coding unit can be split into transform blocks based on the prediction partition mode and/or the prediction mode (a bitstream does not need to be parsed or only a small amount of information in a bitstream needs to be parsed). Therefore, video coding complexity can be reduced, and coding efficiency can be improved.

Optionally, the obtaining a transform block of the current coding unit based on the prediction partition mode and/or the prediction mode may include: splitting the current coding unit into transform blocks based on the prediction partition mode and/or the prediction mode.

For example, when the prediction mode is the intra prediction mode, and the prediction partition mode of the luma coding block is vertical quartering partition or vertical asymmetric binary split, the luma coding block may be split through vertical quartering partition, to obtain a luma transform block, and the chroma coding block is not split and the chroma coding block is used as a chroma transform block.

Alternatively, when the prediction mode is the intra prediction mode, and the prediction partition mode of the luma coding block is horizontal quartering partition or horizontal asymmetric binary split, the luma coding block may be split through horizontal quartering partition, to obtain a luma transform block, and the chroma coding block is not split and the chroma coding block is used as a chroma transform block.

Alternatively, when the prediction mode is the intra prediction mode, the current coding unit may not be split, and the current coding unit is used as a transform unit. In other words, the luma coding block may not be split, and the luma transform block may be directly obtained. Similarly, the chroma coding block may not be split, and the chroma transform block may be directly obtained.

For another example, when the prediction mode is the inter prediction mode, the current coding unit may be split into transform blocks in any one of the following modes:

Mode 1:

When the prediction mode is the inter prediction mode, and the prediction partition mode of the luma coding block is vertical quartering partition or vertical asymmetric binary split, the luma coding block may be split through vertical quartering partition, to obtain a luma transform block.

For the chroma coding block, the chroma coding block may not be split, and the chroma coding block is used as a chroma transform block; or the chroma coding block may be split through vertical quartering partition; or when the chroma coding block is pre-split through vertical quartering partition, and a side length of one side of an obtained chroma transform block is 4, the chroma coding block is not split, and the chroma coding block is used as the chroma transform block.

Mode 2:

When the prediction mode is the inter prediction mode, and the prediction partition mode of the luma coding block is horizontal quartering partition or horizontal asymmetric binary split, the luma coding block may be split through horizontal quartering partition, to obtain a luma transform block.

For the chroma coding block, the chroma coding block may not be split, and the chroma coding block is used as a chroma transform block; or the chroma coding block may be split through horizontal quartering partition; or when the chroma coding block is pre-split through horizontal quartering partition, and a side length of one side of an obtained chroma transform block is 4, the chroma coding block is not split, and the chroma coding block is used as the chroma transform block.

Mode 3:

When the prediction mode is the inter prediction mode, the current coding unit may not be split, and the current coding unit is used as a transform unit. In other words, the luma coding block may not be split, and the luma transform block may be directly obtained. Similarly, the chroma coding block may not be split, and the chroma transform block may be directly obtained.

In this embodiment of this application, the transform block of the current coding unit is obtained directly based on the prediction partition mode and/or the prediction mode (a bitstream does not need to be parsed or only a small amount of information in a bitstream needs to be parsed). Therefore, video coding complexity can be reduced, and coding efficiency can be improved.

S1230: Generate a reconstructed picture block of the current coding unit based on the transform block.

Optionally, the reconstructed picture block of the current coding unit can be generated based on the prediction block and the transform block.

The prediction information of the luma prediction block and the residual information of the luma transform block may be obtained from a bitstream through parsing or derivation.

The prediction information of the luma prediction block may include a prediction mode, an intra prediction mode, motion information, and the like. The prediction mode may indicate an intra prediction mode or an inter prediction mode, and the intra prediction mode may be a planar mode (planar mode), a direct current mode (DC mode), or an angular mode (angular mode). The motion information may include information such as a prediction direction (forward, backward, or bidirectional), a reference frame index (reference index), or a motion vector (motion vector).

The residual information of the luma transform block may include a coded block flag (coded block flag, cbf), a transform coefficient, a transform type (for example, DCT-2, DST-7, or DCT-8), and the like.

After the prediction information of each luma prediction block and the residual information of each luma transform block are obtained, inter prediction processing or intra prediction processing may be performed on each luma prediction block based on a prediction mode corresponding to each luma prediction block, to obtain an inter prediction picture or an intra prediction picture of each luma prediction block. Then, based on the residual information of each luma transform block, the transform coefficient is inversely quantized and inversely transformed to obtain a residual picture of each luma transform block. The predicted picture of each luma prediction block and the residual picture of each luma transform block are added to generate a reconstructed picture of the luma block.

Similarly, the prediction information of the chroma prediction block and the residual information of the chroma transform block may be obtained from a bitstream through parsing or derivation.

The intra prediction mode of the chroma prediction block may be a direct current mode, a planar mode, an angular mode, or a linear model (linear model) mode.

Optionally, the transform type of the chroma transform block may be DCT-2 transform.

After the prediction information of each chroma prediction block and the residual information of each chroma transform block are obtained, inter prediction processing or intra prediction processing may be performed on each chroma prediction block based on a prediction mode corresponding to each chroma prediction block, to obtain an inter prediction picture or an intra prediction picture of each chroma prediction block. Then, based on the residual information of each chroma transform block, the transform coefficient is inversely quantized and inversely transformed to obtain a residual picture. The predicted picture of each chroma prediction block and the residual picture of each chroma transform block are added to generate a reconstructed picture of the chroma block.

In this case, the reconstructed picture block of the current coding unit may be generated based on the reconstructed picture of the luma block and the reconstructed picture of the chroma block.

In this embodiment of this application, the transform block of the current coding unit can be obtained based on the prediction partition mode and/or the prediction mode (a bitstream does not need to be parsed or only a small amount of information in a bitstream needs to be parsed). In this case, the reconstructed picture block of the current coding unit is generated based on the transform block, so that video coding complexity can be reduced, and coding efficiency can be improved.

Figure 14:
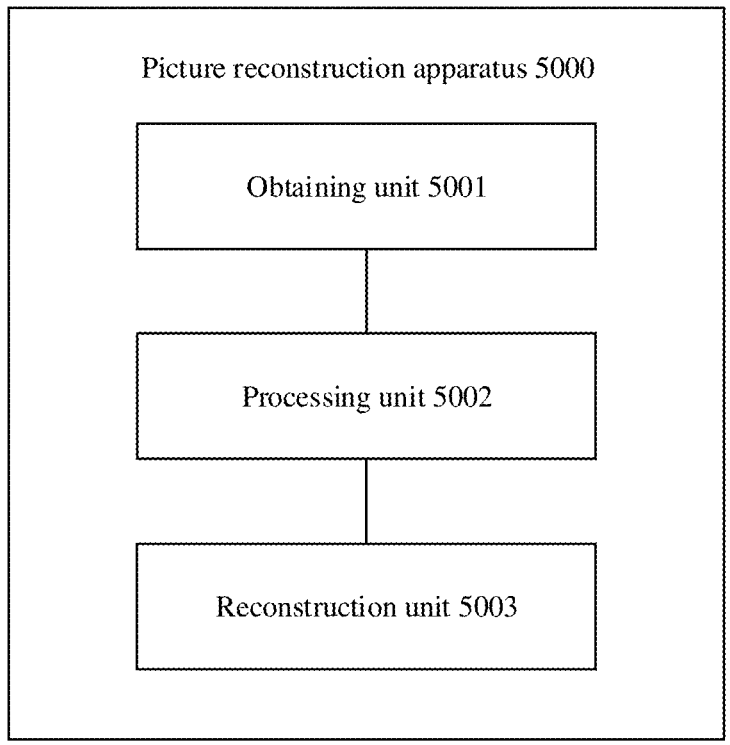
FIG. 14 is a schematic block diagram of a picture reconstruction apparatus according to an embodiment of this application.

FIG. 14 is a schematic block diagram of a picture reconstruction apparatus according to an embodiment of this application. The picture reconstruction apparatus 5000 shown in FIG. 14 includes:

an obtaining unit 5001, configured to: obtain a prediction mode of a current coding unit, and/or obtain a prediction partition mode of the current coding unit, where the current coding unit includes a luma coding block and a chroma coding block, and the prediction partition mode is a mode of splitting the current coding unit into prediction blocks or prediction units;

a processing unit 5002, configured to obtain a transform block of the current coding unit based on the prediction partition mode and/or the prediction mode; and a reconstruction unit 5003, configured to generate a reconstructed picture block of the current coding unit based on the transform block.

In this embodiment of this application, the transform block of the current coding unit can be obtained based on the prediction partition mode and/or the prediction mode (a bitstream does not need to be parsed or only a small amount of information in a bitstream needs to be parsed). In this case, the reconstructed picture block of the current coding unit is generated based on the transform block, so that video coding complexity can be reduced, and coding efficiency can be improved.

Optionally, the processing unit 5002 is configured to split the current coding unit into transform blocks based on the prediction partition mode and/or the prediction mode.

Optionally, the obtaining unit 5001 is configured to obtain the prediction mode from a bitstream through parsing or derivation, where the prediction mode includes an intra prediction mode and an inter prediction mode.

Optionally, the obtaining unit 5001 is configured to: determine, based on a size of the current coding unit, candidate prediction partition modes that are allowed to be used for the current coding unit; and determine the prediction partition mode from the candidate prediction partition modes that are allowed to be used.

Optionally, the obtaining unit 5001 is configured to determine the prediction partition mode of the current coding unit based on the size of the current coding unit.

Optionally, the processing unit 5002 is further configured to: when the prediction mode is the intra prediction mode, split the luma coding block in the prediction partition mode to obtain a luma prediction block; and skip splitting the chroma coding block, and use the chroma coding block as a chroma prediction block.

Optionally, the processing unit 5002 is further configured to: when the prediction mode is the inter prediction mode, skip splitting the current coding unit, and use the current coding unit as a prediction unit.

Optionally, the processing unit 5002 is further configured to: when the prediction mode is the inter prediction mode, split the current coding unit in any one of the following modes: splitting the luma coding block in the prediction partition mode to obtain a luma prediction block, and splitting the chroma coding block in the prediction partition mode to obtain a chroma prediction block; or splitting the luma coding block in the prediction partition mode to obtain a luma prediction block, and when there are two luma prediction blocks and a length of at least one side of at least one of the two luma prediction blocks is 4, skipping splitting the chroma coding block and using the chroma coding block as a chroma prediction block.

Optionally, the processing unit 5002 is configured to: when the prediction mode is the intra prediction mode, and the prediction partition mode of the luma coding block is vertical quartering partition or vertical asymmetric binary split, split the luma coding block through vertical quartering partition to obtain a luma transform block, and skip splitting the chroma coding block and use the chroma coding block as a chroma transform block; or when the prediction mode is an intra prediction mode, and the prediction partition mode of the luma coding block is horizontal quartering partition or horizontal asymmetric binary split, split the luma coding block through horizontal quartering partition to obtain a luma transform block, and skip splitting the chroma coding block and use the chroma coding block as a chroma transform block.

Optionally, the processing unit 5002 is configured to: when the prediction mode is the inter prediction mode, skip splitting the current coding unit, and use the current coding unit as a transform unit.

Optionally, the processing unit 5002 is further configured to determine whether to allow splitting of the current coding unit to obtain a prediction block when the size of the current coding unit meets at least one of the following conditions: a ratio of a width to a height of the current coding unit is less than P, where P is a positive integer; or a maximum side length of the current coding unit is equal to a preset threshold; and perform the step of obtaining the prediction partition mode of the current coding unit when it is determined that splitting of the current coding unit to obtain a prediction block is allowed.

The picture reconstruction apparatus 5000 may be an encoder device or a decoder device.

When the picture reconstruction apparatus 5000 is an encoder device, the obtaining unit 5001 in the picture reconstruction apparatus 5000 may correspond to the prediction processing unit 260 in the encoder 20 shown in FIG. 2; the processing unit 5002 may correspond to the prediction processing unit 260, the transform processing unit 206, or the inverse transform processing unit 212 in the encoder 20 shown in FIG. 2, or correspond to a unit for performing block-based splitting not depicted in FIG. 2; and the reconstruction unit 5003 may correspond to at least one of the inverse quantization unit 210, the inverse transform processing unit 212, the residual calculation unit 204, and the reconstruction unit 214 in the encoder 20 shown in FIG. 2.

When the picture reconstruction apparatus 5000 is a decoder device, the obtaining unit 5001 in the picture reconstruction apparatus 5000 may correspond to the prediction processing unit 360 or the entropy decoding unit 304 in the decoder 30 shown in FIG. 3; the processing unit 5002 may correspond to the prediction processing unit 360 or the inverse transform processing unit 312 in the decoder 30 shown in FIG. 3, or correspond to a unit for performing block splitting not depicted in FIG. 3; and the reconstruction unit 5003 may correspond to at least one of the inverse quantization unit 310, the inverse transform processing unit 312, and the reconstruction unit 314 in the decoder 30 shown in FIG. 3.

When the picture reconstruction apparatus 5000 is an encoder device, the obtaining unit 5001, the processing unit 5002, and the reconstruction unit 5003 in the picture reconstruction apparatus 5000 may correspond to the encoding/decoding module 470 in the processor 430 shown in FIG. 4. The encoding/decoding module 470 can perform the steps to be performed by the picture reconstruction apparatus 5000.

When the picture reconstruction apparatus 5000 is a decoder device, the obtaining unit 5001, the processing unit 5002, and the reconstruction unit 5003 in the picture reconstruction apparatus 5000 may correspond to the encoding/decoding module 470 in the processor 430 shown in FIG. 4. The encoding/decoding module 470 can perform the steps to be performed by the picture reconstruction apparatus 5000.

The picture reconstruction apparatus 5000 can be implemented in various apparatuses or devices, including a wireless handset, an integrated circuit (IC), or a set of ICs (for example, a chipset). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or be provided by interoperable hardware units (including one or more processors described above). This is not limited in this embodiment of this application.

In addition, the picture reconstruction apparatus 5000 may also be referred to as a codec device or a codec, and a video picture can be encoded or decoded by using the picture reconstruction apparatus 5000.

For specific execution actions of the foregoing units, refer to the foregoing method embodiments, and details are not described herein again.

Figure 15:
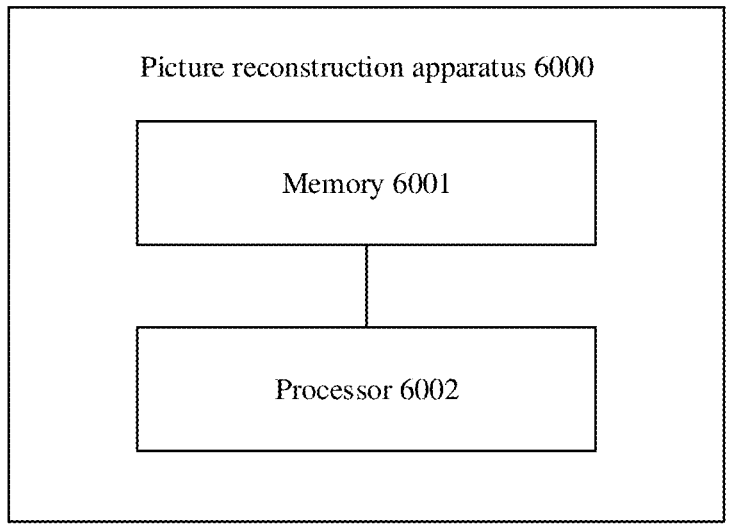
FIG. 15 is a schematic block diagram of a picture reconstruction apparatus according to an embodiment of this application.

FIG. 15 is a schematic block diagram of a picture reconstruction apparatus according to an embodiment of this application. The picture reconstruction apparatus 6000 shown in FIG. 15 includes:

a memory 6001, configured to store a program; and
a processor 6002, configured to execute a program stored in the memory 6001, where when the program stored in the memory 6001 is executed, the processor 6002 is configured to:
obtain a prediction mode of a current coding unit, and/or obtain a prediction partition mode of the current coding unit, where the current coding unit includes a luma coding block and a chroma coding block, and the prediction partition mode is a mode of splitting the current coding unit into prediction blocks or prediction units;
obtain a transform block of the current coding unit based on the prediction partition mode and/or the prediction mode; and
generate a reconstructed picture block of the current coding unit based on the transform block.

The obtaining unit 5001, the processing unit 5002, and the reconstruction unit 5003 in the picture reconstruction apparatus 5000 may correspond to the processor 6002 in the picture reconstruction apparatus 6000. The processor 6002 can implement functions of the obtaining unit 5001, the processing unit 5002, and the reconstruction unit 5003 in the picture reconstruction apparatus 5000.

The memory 6001 in the picture reconstruction apparatus 6000 may correspond to the memory 530 in FIG. 5, and the processor 6002 may correspond to the processor 510 in FIG. 5. The picture reconstruction apparatus 6000 can implement the embodiments of the picture reconstruction method in FIG. 12. The picture reconstruction apparatus 6000 can further perform the steps to be performed by the picture reconstruction apparatus 5000.

In addition, like the picture reconstruction apparatus 5000, the picture reconstruction apparatus 6000 may be either an encoder device or a decoder device.

Similarly, the picture reconstruction apparatus 6000 may also be referred to as a codec device or a codec, and a video picture can be encoded or decoded by using the picture reconstruction apparatus 6000.

For specific execution actions of the processor 6002, refer to the foregoing method embodiments, and details are not described herein again.

It should be understood that, the processor in the embodiments of this application may be a central processing unit (central processing unit, CPU), or may further be another general-purpose processor, a digital signal processor (digital signal processor, DSP), an application specific integrated circuit (application specific integrated circuit, ASIC), a field programmable gate array (field programmable gate array, FPGA), or another programmable logic device, discrete gate or transistor logic device, discrete hardware component, or the like. The general-purpose processor may be a microprocessor, or may be any conventional processor or the like.

It should be further understood that the memory in the embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memory (random access memory, RAM) RAMs may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

As defined in the embodiments of this application, a one-way communication link from an access network to a terminal is a downlink, data transmitted on the downlink is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

The resources described in the embodiments of this application may also be referred to as transmission resources, including one or more types of time-domain resources, frequency-domain resources, and code-domain resources. The resources may be used to bear data or signaling in an uplink communication process or a downlink communication process.

The term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

In the embodiments of this application, "a plurality of" refers to two or more than two.

Descriptions such as "first", "second" in the embodiments of this application are merely used for indicating and distinguishing between described objects, do not show a sequence, do not indicate a specific limitation on a quantity of devices in the embodiments of this application, and do not constitute any limitation on the embodiments of this application.

In the embodiments of this application, "connection" means various connection manners such as a direct connection or an indirect connection, for implementing communication between devices. This is not limited in the embodiments of this application.

Unless otherwise specified, "transmit/transmission" (transmit/transmission) in the embodiments of this application refers to bidirectional transmission, and includes a sending action and/or a receiving action. "transmit/transmission" in the embodiments of this application includes data sending, data receiving, or data sending and data receiving. In other words, data transmission herein includes uplink and/or downlink data transmission. The data may include a channel and/or a signal. The uplink data transmission is uplink channel transmission and/or uplink signal transmission, and the downlink data transmission is downlink channel transmission and/or downlink signal transmission.

Services (service) described in the embodiments of this application are communication services obtained by a terminal device from a network side. The communication services include control plane services and/or data plane services, for example, voice services and data traffic services. Sending or receiving of services includes sending or receiving of service-related data (data) or signaling (signaling).

In the embodiments of this application, a "network" and a "system" convey a same concept, and a communication system is a communication network.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communication medium including any medium that facilitates transfer of a computer program from one place to another (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

Instructions may be executed by one or more processors such as one or more digital signal processors (DSP), general-purpose microprocessors, application-specific integrated circuits (ASIC), field programmable logic arrays (FPGA), or other equivalent integrated circuit or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or be provided by interoperable hardware units (including one or more processors described above).

In the foregoing embodiments, the descriptions in the embodiments have respective focuses. For a part that is not described in detail in an embodiment, refer to related descriptions in other embodiments.

The foregoing descriptions are merely specific example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    obtaining a prediction mode of a current coding unit and a prediction partition mode of the current coding unit;
    wherein the current coding unit comprises a luma coding block and a chroma coding block, and the prediction partition mode is a mode of splitting the current coding unit into prediction blocks or prediction units;
    obtaining a transform block of the current coding unit based on the prediction partition mode and the prediction mode, wherein,
        when the prediction mode is the intra prediction mode and the prediction partition mode of the luma coding block is either a vertical quartering partition,
        splitting the luma coding block through the vertical quartering partition to obtain a luma prediction block;
        obtaining the transform block of the current coding unit based on the luma prediction block; and
        skipping splitting the chroma coding block and using the chroma coding block as a chroma transform block; or
        when the prediction mode is the intra prediction mode and the prediction partition mode of the luma coding block is either a horizontal quartering partition,
        splitting the luma coding block through the horizontal quartering partition to obtain a luma prediction block;
        obtaining a transform block of the current coding unit based on the luma prediction block; and
        skipping splitting the chroma coding block and using the chroma coding block as a chroma transform block;
    generating a reconstructed picture block of the current coding unit based on the transform block.

2. The method according to claim 1, wherein obtaining the prediction mode of the current coding unit further comprises:
    obtaining the prediction mode from a bitstream through parsing or derivation, wherein the prediction mode comprises an intra prediction mode and an inter prediction mode.

3. The method according to claim 1, wherein obtaining the prediction partition mode of the current coding unit further comprises:
    determining, based on a size of the current coding unit, candidate prediction partition modes that are allowed to be used for the current coding unit; and
    determining the prediction partition mode from the candidate prediction partition modes that are allowed to be used.

4. An apparatus comprising:
    an obtaining unit, configured to:
    obtain a prediction mode of a current coding unit, and obtain a prediction partition mode of the current coding unit, wherein the current coding unit comprises a luma coding block and a chroma coding block, and the prediction partition mode is a mode of splitting the current coding unit into prediction blocks or prediction units;
    a processing unit, configured to obtain a transform block of the current coding unit based on the prediction partition mode and the prediction mode, wherein, when the prediction mode is the intra prediction mode and the prediction partition mode of the luma coding block is either a vertical quartering partition,
the processing unit is further configured to:
split the luma coding block through the vertical quartering partition to obtain a luma prediction block,
obtain the transform block of the current coding unit based on the luma prediction block, and
skip splitting the chroma coding block and using the chroma coding block as a chroma transform block; or
when the prediction mode is the intra prediction mode and the prediction partition mode of the luma coding block is either a horizontal quartering partition,
the processing unit is further configured to:
split the luma coding block through the horizontal quartering partition to obtain a luma prediction block
obtain a transform block of the current coding unit based on the luma prediction block, and
skip splitting the chroma coding block and using the chroma coding block as a chroma transform block; and
a reconstruction unit, configured to generate a reconstructed picture block of the current coding unit based on the transform block.

5. The apparatus according to claim 4, wherein the obtaining unit is further configured to obtain the prediction mode from a bitstream through parsing or derivation and the prediction mode comprises an intra prediction mode and an inter prediction mode.

6. The apparatus according to claim 4, wherein the obtaining unit is further configured to:
determine, based on a size of the current coding unit, candidate prediction partition modes that are allowed to be used for the current coding unit; and
determine the prediction partition mode from the candidate prediction partition modes that are allowed to be used.

7. A non-transitory storage medium comprising instructions for executing a method on a processor, the method comprising:
obtaining a transform block of a current coding unit based on a prediction partition mode and a prediction mode, wherein the current coding unit comprises a luma coding block and a chroma coding block, and the prediction partition mode is a mode of splitting the current coding unit into prediction blocks or prediction units;
when the prediction mode is the intra prediction mode and the prediction partition mode of the luma coding block is either a vertical quartering partition,
splitting the luma coding block through the vertical quartering partition to obtain a luma prediction block;
obtaining the transform block of the current coding unit based on the luma prediction block; and
skipping splitting the chroma coding block and using the chroma coding block as a chroma transform block; and
when the prediction mode is the intra prediction mode and the prediction partition mode of the luma coding block is either a horizontal quartering partition,
splitting the luma coding block through the horizontal quartering partition to obtain a luma prediction block;
obtaining a transform block of the current coding unit based on the luma prediction block; and
skipping splitting the chroma coding block and using the chroma coding block as a chroma transform block;
generating a reconstructed picture block of the current coding unit based on the transform block.

\* \* \* \* \*